US012435681B2

(12) United States Patent
Sargent

(10) Patent No.: US 12,435,681 B2
(45) Date of Patent: Oct. 7, 2025

(54) STIRLING ENGINE WITH AT LEAST FOUR PISTON ASSEMBLIES

(71) Applicant: REGENSYS LTD, Crieff (GB)

(72) Inventor: Howard Sargent, Crieff (GB)

(73) Assignee: REGENSYS LTD, Crieff (GB)

( * ) Notice: Subject to any disclaimer, the term of this patent is extended or adjusted under 35 U.S.C. 154(b) by 0 days.

(21) Appl. No.: 18/561,987

(22) PCT Filed: May 16, 2022

(86) PCT No.: PCT/GB2022/051224
§ 371 (c)(1),
(2) Date: Nov. 17, 2023

(87) PCT Pub. No.: WO2022/243660
PCT Pub. Date: Nov. 24, 2022

(65) Prior Publication Data
US 2024/0271588 A1 Aug. 15, 2024

(30) Foreign Application Priority Data
May 17, 2021 (GB) ..................................... 2107042

(51) Int. Cl.
*F02G 1/044* (2006.01)
*F02G 1/043* (2006.01)
*F02G 1/053* (2006.01)

(52) U.S. Cl.
CPC ........... *F02G 1/044* (2013.01); *F02G 1/0435* (2013.01); *F02G 1/053* (2013.01);
(Continued)

(58) Field of Classification Search
CPC . F02G 1/044; F02G 1/045; F02G 2244/50-54
See application file for complete search history.

(56) References Cited

FOREIGN PATENT DOCUMENTS

KR 20100100340 A * 9/2010 ............. F02G 1/044
NO 333268 B1 4/2013
(Continued)

OTHER PUBLICATIONS

ISR and Written Opinion from PCT/GB2022/051224; mailed Aug. 25, 2022; 12 pages.

*Primary Examiner* — Laert Dounis
(74) *Attorney, Agent, or Firm* — Fitch, Even, Tabin & Flannery LLP

(57) ABSTRACT

A Stirling engine comprising a first cylinder comprising a piston configured to separate at least two expansion or compression chambers of the first cylinder, and a second cylinder comprising a piston configured to separate at least two expansion or compression chambers of the second cylinder. The pistons of the first and second cylinders are connected, such that the first and second cylinders form a first piston assembly. Each chamber of the first cylinder is fluidly connected to a chamber of a first cylinder of a second piston assembly such that a working fluid to be compressed/expanded can flow between the fluidly connected chambers of the first and second piston assemblies. Each chamber of the second cylinder is fluidly connected to a chamber of a second cylinder of a third piston assembly such that a working fluid to be compressed/expanded can flow between the fluidly connected chambers of the first and third piston assemblies. The first cylinder and the second cylinder of the first piston assembly are each configured as an expansion cylinder or a compression cylinder.

18 Claims, 11 Drawing Sheets

(52) U.S. Cl.
CPC ...... *F02G 2244/50* (2013.01); *F02G 2244/52* (2013.01); *F02G 2244/54* (2013.01)

(56) References Cited

FOREIGN PATENT DOCUMENTS

| | | | | |
|---|---|---|---|---|
| WO | 2007019815 A1 | | 2/2007 | |
| WO | WO-2014012586 A1 | * | 1/2014 | ............. F02G 1/043 |
| WO | 2020236881 A1 | | 11/2020 | |

* cited by examiner

STIRLING ENGINE WITH AT LEAST FOUR PISTON ASSEMBLIES

CROSS-REFERENCE TO RELATED APPLICATIONS

This application is a U.S. national phase application of International Application No. PCT/GB2022/051224, filed May 16, 2022, designating the United States, which claims priority to UK Application No. 2107042.0, filed May 17, 2021, which is incorporated by reference herein in its entirety.

TECHNICAL FIELD OF THE INVENTION

A device for converting heat energy into electrical or mechanical energy. The invention relates to Stirling engines and particularly, but not exclusively, to Stirling engines in which each cylinder is an expansion cylinder or a compression cylinder, such that each cylinder is entirely "hot" or entirely "cold". Other aspects of the invention will be apparent from a reading of the specification.

BACKGROUND TO THE INVENTION

Global warming, shrinking fossil fuel resources and increasing energy demand make it essential to improve the efficiency of existing power consuming processes and to access new sources of energy that have not, until recently, been economically or practically available.

Biomass, geothermal energy and waste heat from industrial, commercial and other low temperature heat sources are widely available for exploitation as sources of useful energy, but their potential has been largely neglected, partly due to the relative cheapness of fossil fuels and because the reduction of $CO_2$ emissions has not been considered an important political and environmental issue until relatively recently.

Also, many waste industrial and geothermal energy sources provide heat at relatively low temperatures, in the range from 100 to 200° C. and it is difficult to extract useful work at these low thermal values.

The lower the temperature, the more economically challenging the process of energy conversion becomes as the equipment tends to become increasingly expensive relative to the energy available for conversion, until the point where the construction of heat energy conversion plant is economically impractical.

Nevertheless, many industrial processes are extremely energy consuming and generate large quantities of waste heat. Temperatures vary with the process and industry, but as with geothermal energy, the lower the temperature, the more waste heat resource is available for conversion to electrical or mechanical energy, though at a lower quality.

Previously, for heat sources below 200° C., Organic Rankine binary cycle plants have been employed.

These plants generally use a working fluid, such as pentane, which changes phase from liquid to gas at a relatively low temperature, in order to drive a turbine. However, the plants tend to be volumetrically large, and contain expensive and complex machinery and so may be difficult to install and retrofit, and may require regular and expensive maintenance cycles. Generally, binary cycles using a turbine system are not considered to be economic for smaller scale power generation.

Stirling engines, which are a type of heat engine powered by an external heat source, are in principle particularly suitable devices for the conversion of heat into energy. The thermodynamic cycle is simple and they are highly robust, quiet, and reliable, and take up less space than the Organic Rankine Cycle.

However, they are at present relatively inefficient when operating with a low temperature heat source.

A Stirling engine extracts power by utilising the cycle of a fixed mass of gas, known as the working fluid, using the temperature difference between the hot end and cold ends of the device. The gas is alternately heated and expanded, and then cooled and compressed, and the cyclically varying volume of the gas generates a pressure wave which acts on a power piston and converts thermal energy into mechanical energy. The higher the temperature difference between the hot source and cold heat sink, the higher will be the theoretical thermal efficiency of a Stirling device.

A displacer piston moves the working gas back and forth between the warm expansion and the cold compression spaces while passing hot and cold heat exchangers, which may be external or internal to the device, and are typically located on either side of a regenerator. As the working fluid moves through the regenerator between the hot and the cold side, its heat is transferred into the regenerator's matrix.

The heat is reabsorbed by the gas on the return cycle, and so a high temperature gradient is maintained.

The working fluid or gas is most commonly air, hydrogen or helium. In normal operation, the engine is sealed and no gas enters or leaves the engine. No valves are required, unlike other types of piston engines. The heat exchangers may be in the form of tubes, fins or plates which are in contact with a heat source which may be, for instance, a fuel burner, geothermal brine or hot gas. Similarly, the cold heat exchanger is in thermal contact with an external heat sink which may be air at ambient temperature.

The lack of development of heat engines for lower temperature operation is partly a consequence of the limiting factor of the relatively low temperature differential between the hot and cold sides of the system. However, within these constraints, economic efficiencies can be made by reducing maintenance and lowering the costs of fabrication and materials, and operational and mechanical efficiencies can be achieved through reducing friction and improving heat exchange.

Three different basic types of Stirling Engine can be distinguished as follows:

Alpha engines: the enclosed gas volume is expanded and compressed between two pistons in two separate chambers and generates an oscillatory pressure waveform inside the engine. Coupling to the pressure waveform, the pistons move and so extract the mechanical work that is produced by the thermodynamic cycle of the Stirling engine. Each piston is typically connected to a crankshaft or other kinematic device in order that the correct phase delay between pistons may be maintained and that overall momentum of the system may be sustained.

Beta engines: a displacer piston, typically connected to a flywheel or similar arrangement, shuttles the working gas between hot and cold areas of a cylinder as above. A power piston within the same cylinder, connected to the same kinematic arrangement, compresses and expands the fluid.

Gamma engines: these are similar to beta engines, but piston and displacer are not located in the same cylinder.

Free piston engines may theoretically be incorporated into any of the above configurations. The free-piston Stirling engine is a comparatively recent type of heat engine, developed in the 1960s by Prof. William T. Beale at Ohio University. It has mainly been deployed within beta configuration engines and comprises a displacer and a power piston which are unconnected, and which oscillate freely within a single common cylinder. The oscillations between the displacer and the power piston may be supported by physical springs, by the use of elastomeric materials, or by the compressibility of the working gas. The springs or elastomeric materials or other similar element, provide the forces necessary to maintain the harmonic oscillations of the displacer piston relative to the power piston. The absence of a crank mechanism significantly reduces the number of moving parts and the complexity of the engine and thus reduces frictional losses. In particular, the absence of a crankshaft eliminates losses from crankshaft bearings and piston rod seals, and the linear motion leads to very low side loads on the piston, which also reduces the need for cylinder lubrication. The displacer characteristically has a very small mass compared to the power piston, and its oscillation is damped by the gas flowing through the regenerator. The heavier power piston oscillates undamped, except for the forces from the electromagnetic field of an alternator or other arrangement which may act as the power take off.

Free Piston engine systems have previously been found to be most useful for applications where a high temperature difference is available, and where high reliability with low or zero maintenance is required, such as solar dish arrays, or for space exploration, where a radioactive heat source may be deployed to power the device.

Stirling Engines may also be described in terms of Single or Multiple Systems. A single acting Stirling system comprises one or two cylinders and is the arrangement used almost invariably for small low power units, say up to 10 KW capacity and includes the alpha, beta and gamma arrangements as outlined above, including free piston Stirling engine embodiments.

In a single acting system, the there is only one continuous volume or thermodynamic system of working fluid. Single acting systems may however be connected by linkages to provide multiple systems as outlined below. Typical alpha type free piston Stirling engines are considered to be single acting systems.

Double acting systems are generally alpha Stirling engine arrangements of at least two cylinders, in which at least one cylinder is equipped with a common double acting piston serving two separate Stirling systems, such that two separate volumes of working fluid are employed on each side of the common piston. Examples of this arrangement include the Franchot arrangement of FIG. 1, and the Rallis and Martini arrangements.

A major advantage of double acting arrangements is that the number of reciprocating parts per Stirling system is effectively half the number necessary in single acting systems. The configuration also eliminates the need for a rebound device, as the working piston provides the work to drive the compression process in the other cylinder. This allows a simple and more compact device with a higher power density ratio than single acting engines.

A multiphase Stirling engine arrangement incorporates at least three double acting systems and therefore at least three pistons. In a typical multiphase Stirling arrangement, an alpha-type Stirling engine is connected to its adjacent two engines via its two pistons. The hot side of each cylinder is connected via a regenerator to the cold side of the adjoining cylinder so that, as with a typical double acting system, the working fluid in each engine of a multiphase system is contained between two pistons in two separate cylinders. Each piston is therefore linked to its adjacent two pistons via the pressure waveform of the working fluids. Each piston within each cylinder is typically connected via a piston rod to a crankshaft piston or wobble plate piston rod so that the correct phase angle or delay between pistons may be maintained.

The Dutch electronics company, Philips, produced the first double acting twin and multiphase cylinder devices in the 1940s, originally as part of a research effort to provide a cheap and portable electrical generator to power radios in remote and underdeveloped regions. These were based upon designs by Siemens in the 19th Century and Rinia the mid-20th Century and are generally referred to as Siemens/Rinia double acting multiphase arrangements. Research and production ceased in the 1950s when the devices proved to be uneconomic. However, variations on these original multiphase designs were later taken up by companies such as Whispergen, which utilises a wobble yoke mechanism connected to four pistons within a double acting alpha type cylinder arrangement.

Free piston versions of multiphase arrangements have also been proposed, but have not, as yet, been successfully commercialized.

Drawbacks of current systems include the following issues. As outlined above, for low temperature heat energy conversion devices the power available for use is limited by the temperature of the thermal resource, and therefore the mechanical efficiencies need to be high in order for a device to be economically viable. Friction and wear reduce efficiencies significantly. In particular, the need to maintain effective piston and displacer seals against leakage of working fluid may result in unacceptably high frictional losses. Kinematic connections between pistons, including piston rod seals and crankshaft bearings, may also increase such inefficiencies, may be expensive to fabricate and maintain, and may lead to losses of working fluid from within pressurised systems.

Additionally, for the efficient operation of a heat engine there needs to an effective thermal separation between the hot and cold parts, or ends, of the device or system. If the expansion and compression spaces are contained within the same cylinder then there may be high thermal conduction losses from the hot to the cold sides via the cylinder walls, and also through the piston. This is typically addressed by designing pistons and the cylinders which are long relative to the bore dimeter in order to provide a greater spatial and so thermal separation between each end of a cylinder, while reducing the length of the thermal path. The insertion of thermal breaks within the pistons and cylinder walls is also required.

These solutions are generally expensive and may generate system inefficiencies. The issue is even more problematic in lower temperature Stirling devices, as a maximal area of heat exchange is required, which will preferably include the hot side cylinder walls and which may result in the need for further hardware and components in order to effectively separate the heat source from the heat sink within the same cylinder.

Heat exchangers are typically the most expensive and the most critical components of any heat energy conversion device. The cost of fabricating, installing and maintaining complex heat exchanger assemblies has generally resulted in devices failing to succeed in the market place. Additionally, the characteristics and configurations of heat exchanger assemblies tend to be specific to each heat energy conversion device, and depending on the design of the arrangement, the layout and configuration of the pistons and cylinders may be incompatible with an optimal heat exchanger design.

In order to minimise fluid friction, a low temperature device requires short and straight heat exchanger tubes, whereas for the Finkelstein arrangement as shown in FIG. 2, the spatial layout of expansion and compression spaces and the length of cylinders generally results in heat exchanger paths which are excessively long and irregular and with varying volumes of dead space within each regenerator and heat exchanger assembly, leading to inefficiencies and non-symmetric power generation. For free piston operation, the pressures acting on each piston assembly must be equal and symmetric for each time variable piston stroke. For such a capability, the connecting ducts between hot and cold thermodynamic spaces must also be equal and preferably contain minimal and designed dead space.

A device which provides free piston operation and negates kinematic crank mechanisms, which offers efficient operation and high power densities over a broad range of temperatures, which incorporates short and equal fluid heat exchanger and regenerator connections, and which provides entirely hot or entirely cold cylinders, has not previously been available and so is provided within at least some of the described arrangements herein.

It would be desirable to provide an engine or device for efficiently and economically extracting usable electrical energy from a wide range of heat sources, including low to medium temperature heat sources such as waste heat, biomass and geothermal energy and from heat sources at higher temperatures. It would be desirable to provide an engine or device which, through the application of oscillating mechanical energy to piston shafts, may be capable to extract heat from an environment or system and so may operate as a cooling device or cryocooler.

STATEMENTS OF INVENTION

According to a first aspect of the invention, there is provided a Stirling engine comprising:

- a first cylinder comprising a piston configured to separate at least two expansion or compression chambers of the first cylinder;
- a second cylinder comprising a piston configured to separate at least two expansion or compression chambers of the second cylinder;

wherein the pistons of the first and second cylinders are connected, such that the first and second cylinders form a first piston assembly;

wherein each chamber of the first cylinder is fluidly connected to a chamber of a first cylinder of a second piston assembly such that a working fluid to be compressed/expanded can flow between the fluidly connected chambers of the first and second piston assemblies; and wherein each chamber of the second cylinder is fluidly connected to a chamber of a second cylinder of a third piston assembly such that a working fluid to be compressed/expanded can flow between the fluidly connected chambers of the first and third piston assemblies; and wherein the first cylinder and the second cylinder of the first piston assembly are each configured as an expansion cylinder or a compression cylinder.

The Stirling engine may be an alpha Stirling engine. The Stirling engine may be a double acting system. The Stirling engine may be a double acting alpha Stirling engine. The Stirling engine may be a multiphase Stirling engine.

The engine is a heat energy conversion device. It will be understood that the engine could be used to convert mechanical movement of the pistons to extract heat from an environment or system, such that the device may operate as a cooling device or cryocooler.

The engine may comprise one or more piston assemblies, two or more piston assemblies, three or more piston assemblies, four or more piston assemblies, six or more piston assemblies, eight or more piston assemblies, 12 or more piston assemblies, 16 or more piston assemblies, or any suitable number of piston assemblies. The number of piston assemblies of the engine may be a multiple of 2, a multiple of 4, or any suitable number.

The engine may comprise one or more additional piston assemblies. The, or each additional piston assembly, may be arranged such that the first cylinders thereof are fluidly connected to a first cylinder of a piston assembly of the engine and such that the second cylinders thereof are fluidly connected to a second cylinder of another piston assembly of the engine. The, or each additional piston assembly, may have a piston connection between the first and second cylinders thereof. In this arrangement, any suitable number of piston assemblies can be arranged in sequence.

The engine may comprise the second piston assembly. The engine may comprise the third piston assembly. The engine may comprise a fourth piston assembly. The engine may comprise a fifth piston assembly.

The piston assemblies may be identical.

Each cylinder of each piston assembly may comprise a piston configured to separate at least two expansion/compression chambers of the cylinder.

The pistons of the first and second cylinders of each piston assembly may be connected.

Each chamber of the second cylinder of the second piston assembly may be fluidly connected to a chamber of a second cylinder of the fourth piston assembly, such that a working fluid to be compressed/expanded can flow between the fluidly connected chambers of the second and fourth piston assemblies.

Each chamber of a first cylinder of the third piston assembly may be fluidly connected to a chamber of a first cylinder of the fifth piston assembly such that a working fluid to be compressed/expanded can flow between the fluidly connected chambers of the third and fifth piston assemblies.

Each chamber of the first cylinder of the fourth piston assembly may be fluidly connected to a chamber of a first cylinder of the third piston assembly.

The engine may be configured in a closed loop arrangement. In this arrangement, the engine comprises at least four piston assemblies, with all cylinders having fluid connections to another cylinder of the engine. For example, the fourth piston assembly may be connected to the third piston assembly in a sequence: 1, 3, 4, 2, then back to 1, and it will be understood that the sequence depends on the number of piston assemblies employed. For 8 piston assemblies, the sequence could be: 1, 3, 5, 7, 8, 6, 4, 2, and back to 1. The engine may be configured in a series closed loop arrangement.

It will be understood that the engine may be configured in an open loop. In this arrangement, there may be end piston assemblies. The end piston assemblies could be the second and third piston assemblies, the third and fourth piston assemblies, the fourth and fifth piston assemblies, or any subsequent piston assemblies. The end piston assemblies may be fluidly connected to one other piston assembly of the engine.

Each odd numbered piston assembly may be fluidly connected to an even numbered piston assembly.

The chambers of each first cylinder of each even numbered piston assembly may be fluidly connected to the chambers of a first cylinder of an odd numbered piston assembly. The chambers of each second cylinder of each even numbered piston assembly may be fluidly connected to the chambers of a second cylinder of an odd numbered piston assembly.

Each first cylinder of each piston assembly may be configured as an expansion cylinder, or as a compression cylinder. Each second cylinder of each piston assembly may be configured as an expansion cylinder or as a compression cylinder. In these arrangements, the at least two chambers of each cylinder are each expansion spaces, or are each compression spaces, depending on whether the cylinder is an expansion or compression cylinder. It will be understood that in this example, each cylinder is a "hot" cylinder or a "cold" cylinder, and each cylinder does not have a combination of expansion and compression spaces (as is common in some types of Stirling engine).

Each first cylinder and each second cylinder of each piston assembly may be configured as an expansion cylinder or a compression cylinder.

The first and second cylinders of each piston assembly may be configured to be the opposite type of expansion/compression cylinder to each other. In this example, if the first cylinder of a piston assembly is an expansion cylinder, the second cylinder of the same piston assembly would be a compression cylinder, or vice versa.

The first cylinder of each piston assembly may be configured to be the opposite type of expansion/compression cylinder to the cylinder to which it is fluidly connected. The second cylinder of each piston assembly may be configured to be the opposite type of expansion/compression cylinder to the cylinder to which it is fluidly connected.

The first cylinder of the first piston assembly may be configured to be an expansion cylinder and the second cylinder of the first piston assembly may be configured to be a compression cylinder, or vice versa.

The first and second cylinders of each piston assembly may be fluidly isolated from each other. The chambers of the first cylinder of each piston assembly may be fluidly isolated from the chambers of the second cylinder of the piston assembly.

The engine may be configured such that the first and second cylinders of each piston assembly are fluidly connected to different piston assemblies. Each first cylinder of each piston assembly may be fluidly connected to a first cylinder of a piston assembly, and each second cylinder may be fluidly connected to a second cylinder of another piston assembly. Each first cylinder of each piston assembly may be fluidly connected to a first cylinder of a piston assembly, and each second cylinder may be fluidly connected to a second cylinder of another piston assembly, such that the first and second cylinders of each piston assembly are fluidly connected to different piston assemblies.

The term "cylinder" is used to convey its function within an engine, and is not an indication of its shape. It will be understood that each cylinder may take any suitable shape and form. Each cylinder may be substantially cylindrical, or any other suitable shape, such as cuboidal, ovoidal, or the like.

Each cylinder may be a substantially rigid cylinder.

Each cylinder may be spaced apart from the other cylinders.

Each chamber of each cylinder may be fluidly isolated from the other chamber, or chambers of the cylinder. The piston of each cylinder may be configured to fluidly isolate each chamber of the cylinder from the other chamber, or chambers, of the cylinder.

Each cylinder may comprise at least a first chamber and a second chamber. Each cylinder may comprise two or more chambers, or any suitable number of chambers.

The first chamber of the first cylinder of the first piston assembly may be fluidly connected to the first chamber of the first cylinder of the second piston assembly. The second chamber of the first cylinder of the first piston assembly may be fluidly connected to the second chamber of the first cylinder of the second piston assembly.

The first chamber of the second cylinder of the first piston assembly may be fluidly connected to the first chamber of the second cylinder of the third piston assembly. The second chamber of the second cylinder of the first piston assembly may be fluidly connected to the second chamber of the second cylinder of the third piston assembly.

Each first chamber of each first cylinder of each piston assembly may be fluidly connected to a first chamber of a first cylinder of another piston assembly. Each second chamber of each first cylinder of each piston assembly may be fluidly connected to a second chamber of a second cylinder of another piston assembly.

Each first chamber of each second cylinder of each piston assembly may be fluidly connected to a first chamber of a second cylinder of another piston assembly. Each second chamber of each second cylinder of each piston assembly may be fluidly connected to a second chamber of a second cylinder of another piston assembly.

Each first chamber of each cylinder may be fluidly isolated from the second chamber thereof.

Each of the fluidly connected chambers may have a fluid flow path therebetween for the working fluid.

Each of the fluidly connected chambers may have a fluid flow path therebetween for the working fluid, and the fluid flow paths between the chambers of the fluidly connected first cylinders may be substantially identical.

Each of the fluidly connected chambers may have a fluid flow path therebetween for the working fluid, and the fluid flow paths between the chambers of the fluidly connected second cylinders may be substantially identical.

The fluid flow paths between each of the fluidly connected chambers may be substantially identical.

The fluid connections between each first cylinder may be configured such that the fluid flow path between the first chambers is substantially equal in length to the fluid flow path between the second chambers. The fluid connections between each second cylinder may be configured such that the fluid flow path between the first chambers is substantially equal in length to the fluid flow path between the second chambers.

The fluid connections between each first cylinder may be configured such that the fluid flow path between the first chambers is substantially identical to the fluid flow path between the second chambers. The fluid connections between each second cylinder may be configured such that the fluid flow path between the first chambers is substantially identical to the fluid flow path between the second chambers.

The fluid flow path between the first chambers of the first and second piston assemblies may be configured to be substantially equal in length to the fluid flow path between the second chambers of the first and second piston assemblies. The fluid flow path between the first chambers of the first and third piston assemblies may be configured to be substantially equal in length to the fluid flow path between the second chambers of the first and third piston assemblies.

The engine may comprise one or more fluid conduits for fluidly connecting the chambers of the cylinders. The fluid conduits may take any suitable form and shape, and it will be understood that single or multiple fluid conduits may be used to fluidly connect the chambers of the cylinders.

Each of the fluid conduits connecting the chambers of the fluidly connected first cylinders may be substantially identical. Each of the fluid conduits connecting the chambers of the fluidly connected second cylinders may be substantially identical. Each fluid conduit may be substantially identical.

Each of the fluid conduits connecting the chambers of the fluidly connected first cylinders may have a substantially identical fluid flow path. Each of the fluid conduits connecting the chambers of the fluidly connected second cylinders may have a substantially identical fluid flow path. Each fluid conduit may have a substantially identical fluid flow path.

At least a portion of each of each of the fluid conduits connecting the chambers of the fluidly connected first cylinders may be arranged to be substantially parallel. At least a portion of each of the fluid conduits connecting the chambers of the fluidly connected second cylinders may be arranged to be substantially parallel.

The fluidly connected first cylinders may include substantially parallel fluid conduits, or substantially parallel fluid conduit portions. Each of the fluidly connected second cylinders may include substantially parallel fluid conduits, or substantially parallel fluid conduit portions.

The engine may be configured such that all of the chambers of the first cylinder of the first piston assembly are all expansion spaces or are all compression spaces. The engine may be configured such that all of the chambers of the second cylinder of the first piston assembly are all expansion spaces or are all compression spaces. The engine may be configured such that all of the chambers of the first cylinder of the second piston assembly are all expansion spaces or are all compression spaces. The engine may be configured such that all of the chambers of the second cylinder of the second piston assembly are all expansion spaces or are all compression spaces. The engine may be configured such that all of the chambers of the first cylinder of the third piston assembly are all expansion spaces or are all compression spaces. The engine may be configured such that all of the chambers of the second cylinder of the third piston assembly are all expansion spaces or are all compression spaces.

The engine may be configured such that every expansion cylinder is fluidly connected to a compression cylinder. The engine may be configured such that the chambers of each expansion cylinder are fluidly connected to the chambers of a compression cylinder.

The engine may be configured to have only expansion cylinders and compression cylinders. In this arrangement, the engine does not include any cylinders that have both an expansion space and a compression space. In this example, this means that each cylinder could be either entirely "hot" or entirely "cold".

The engine may be operable to apply heating to one or more cylinders of the engine. The engine may be operable to apply cooling to one or more cylinders of the engine. The engine may be operable to apply heating or cooling to one or more of the cylinders of the engine.

One or more cylinders may be connectable to a source of heat energy or a cooling element, such as a heat sink. Each cylinder may be connectable to a source of heat energy or a cooling element. The engine may comprise a source of heat energy for applying heat energy to one or more of the cylinders thereof. The engine may comprise a cooling element for cooling one or more of the cylinders thereof.

It will be understood that the engine may be configured to apply heat to the expansion cylinders and/or to apply cooling to the compression cylinders, as is known in the field of Stirling engines.

The source of heat may include a heat exchanger, or the like. The cooling element may include a heat exchanger, or the like. The source of heat may be from one or more radiation sources. The radiation source may be solar radiation, or another source of radiation. The source of heat may include an external heat source, or sources. The source of heat may include a heating medium for conveying heat from an external source to the cylinder or working fluid therein. The heating medium may be a fluid, a liquid, a gas, a plasma, or the like, configured to convey heat from the external source to the cylinder or working fluid therein. The heating medium may be transferred to the cylinder or working fluid therein via the heat exchanger.

The cooling element may include an external cooling sink, or sinks. The cooling element may include a cooling medium for conveying heat from the cylinder or working fluid therein to the external cooling sink. The cooling medium may be a fluid, a liquid, a gas, a plasma, or the like, configured to convey heat from the cylinder or working fluid therein to the external cooling sink. The cooling medium may be transferred from the cylinder or working fluid therein via the heat exchanger.

The engine may be configured to apply heat to the working fluid within one or more of the cylinders of the engine. The engine may be configured to transfer heat from one or more heat exchangers of the source of heat to the working fluid within one or more of the cylinders of the engine. The engine may be configured to transfer heat from the working fluid of one or more cylinders of the engine to one or more heat exchangers of the cooling element.

One or more of the cylinders of the engine may be configured to apply heating to the working fluid therein. One or more of the cylinders of the engine may be configured to withdraw heat from the working fluid therein. One or more of the cylinders of the engine may be configured to apply heating to the working fluid therein, and one or more of the cylinders of the engine may be configured to withdraw heat from the working fluid therein.

The source of heat may include one or more regenerators. The cooling element may include one or more regenerators.

The cooling element may be connected to a source of cooling fluid. The cooling fluid may be air, ambient air, or the like.

The heat source may be configured to heat the cylinder, or cylinders to which it is connected by a temperature of up to about 1,000 degrees Centigrade, optionally up to about 700 degrees Centigrade, up to about 300 degrees Centigrade, optionally up to about 220 degrees Centigrade, optionally up to about 200 degrees Centigrade, optionally between about 80 degrees Centigrade and about 1,000 degrees Centigrade, optionally between about 80 degrees Centigrade and about 300 degrees Centigrade, optionally between about 100 degrees Centigrade and about 200 degrees Centigrade, optionally at least 600 degrees Centigrade, optionally at least 700 degrees Centigrade.

The engine may be configured to apply a temperature difference between each fluidly connected expansion and compression cylinders of up to 1,000 degrees Centigrade, optionally up to about 800 degrees Centigrade, optionally up to about 750 degrees Centigrade, optionally up to about 500 degrees Centigrade, optionally up to about 300 degrees Centigrade, optionally up to about 200 degrees Centigrade, optionally between about 100 degrees Centigrade and about 200 degrees Centigrade.

The, or each, piston may be a double acting piston. The engine may be configured to permit free-piston operation. The engine may be a free-piston engine. The, or each piston may be reciprocating pistons. The connected pistons may be reciprocating pistons. Each cylinder may comprise one or more pistons. Each cylinder may comprise one or more pistons, the, or each piston being configured to separate at least two expansion/compression chambers of the cylinder. Each cylinder may comprise a single piston.

Each piston may comprise one or more piston heads. The piston heads may be rigid piston heads.

The piston head, or heads, may be configured to fluidly isolate the at least two chambers of the cylinder. Each piston head may be configured to form a seal between a wall, or walls, of the cylinder and the piston head.

At least one, or each, piston may comprise one or more biasing members for applying a biasing force to the piston. The, or each biasing member may be connected between the piston and the cylinder, and configured to apply a biasing force to the piston as the piston moves within the cylinder. The, or each biasing member may be a flexible member, an elastomeric member, or a flexible elastomeric member. The elastomeric member may be an annulus-shaped member. The, or each biasing member may be connected to the piston head of each piston. The, or each biasing member may be connected to a wall, or walls, of the cylinder. The piston and the, or each, biasing member may be configured to fluidly isolate the at least two chambers of each cylinder. Each piston and the, or each, biasing member may be configured to form a diaphragm piston assembly. Each piston may be a rigid piston and the, or each biasing member may be a flexible member, an elastomeric member, or a flexible elastomeric member.

The engine may comprise one or more damping assemblies. The, or each damping assembly may be configured to apply a damping force to one or more of the pistons of the engine. The, or each damping assembly may be configured to apply a damping force to two or more connected pistons of the engine. The, or each damping assembly may include a biasing element. The biasing element may be a spring member. The spring member may be a planar spring, or the like.

Each piston may comprise at least one connecting member for connecting the piston to another piston.

The connecting member may be a shaft, rod, elongate member, or the like. The connecting member may be rigid. The connecting member may be a straight connecting member.

The, or each, piston may be connectable to a power take off means. The power take off means may be an alternator assembly, a linear alternator assembly, or the like.

The engine may comprise any suitable number of cylinders. For example, the engine may comprise 4 or more cylinders, 8 or more cylinders, 12 or more cylinders, 16 or more cylinders, or the like.

The working fluid may be a gas. The gas may be air, hydrogen or helium, or any suitable gas.

Each cylinder may comprise a longitudinal axis. Each cylinder may comprise a lateral axis.

The longitudinal axes of the first and second cylinders of the first piston assembly may be in alignment, or substantially in alignment. The longitudinal axes of the first and second cylinders of the second piston assembly may be in alignment, or substantially in alignment. The longitudinal axes of the first and second cylinders of the third piston assembly may be in alignment, or substantially in alignment. The longitudinal axes of the first and second cylinders of the fourth piston assembly may be in alignment, or substantially in alignment. The longitudinal axes of the first and second cylinders of the fifth piston assembly may be in alignment, or substantially in alignment.

The longitudinal axes of the first and second cylinders of each piston assembly may be in alignment, or substantially in alignment. The longitudinal axes of the first and second cylinders of each piston assembly may be coaxial, or substantially coaxial.

Each piston of the engine may be configured to move, in use, along the longitudinal axis of the cylinder in which the piston is located.

The pistons of the fluidly connected cylinders may be parallel.

Each of the fluidly connected first cylinders may be adjacent to each other. The first and second cylinders of each piston assembly may be adjacent to each other. The fluidly connected second cylinders may be adjacent to each other.

Each first cylinder may be spaced apart from the second cylinder to which it is connected.

Each cylinder may be parallel to the cylinder to which it is fluidly connected. The longitudinal axis of each cylinder may be parallel to the longitudinal axis of the cylinder to which it is fluidly connected.

The longitudinal axis of each cylinder may be axially offset from the longitudinal axis of the cylinder to which it is fluidly connected. The axial offset may be along the lateral axis of the cylinder.

Each first cylinder may be spaced apart from the first cylinder to which it is fluidly connected. Each second cylinder may be spaced apart from the second cylinder to which it is connected.

According to a second aspect of the invention, there is provided a system comprising a Stirling engine, the engine comprising:

- a first cylinder comprising a piston configured to separate at least two expansion or compression chambers of the first cylinder;
- a second cylinder comprising a piston configured to separate at least two expansion or compression chambers of the second cylinder;

wherein the pistons of the first and second cylinders are connected, such that the first and second cylinders form a first piston assembly;

wherein each chamber of the first cylinder is fluidly connected to a chamber of a first cylinder of a second piston assembly such that a working fluid to be compressed/expanded can flow between the fluidly connected chambers of the first and second piston assemblies; and wherein each chamber of the second cylinder is fluidly connected to a chamber of a second cylinder of a third piston assembly such that a working fluid to be compressed/expanded can flow between the fluidly connected chambers of the first and third piston assemblies; and wherein the first cylinder and the second cylinder of the first piston assembly are each configured as an expansion cylinder or a compression cylinder.

Embodiments of the second aspect of the present invention may include one or more features of the first aspect of the present invention or its embodiments. Similarly, embodiments of the first aspect of the present invention may include one or more features of the second aspect of the present invention or its embodiments.

According to a third aspect of the invention, there is provided a method of operating an engine, the method comprising the steps of:

(i) providing a Stirling engine, the engine comprising:

a first cylinder comprising a piston configured to separate at least two expansion or compression chambers of the first cylinder;

a second cylinder comprising a piston configured to separate at least two expansion or compression chambers of the second cylinder;

wherein the pistons of the first and second cylinders are connected, such that the first and second cylinders form a first piston assembly;

wherein each chamber of the first cylinder is fluidly connected to a chamber of a first cylinder of a second piston assembly such that a working fluid to be compressed/expanded can flow between the fluidly connected chambers of the first and second piston assemblies; and wherein each chamber of the second cylinder is fluidly connected to a chamber of a second cylinder of a third piston assembly such that a working fluid to be compressed/expanded can flow between the fluidly connected chambers of the first and third piston assemblies; and wherein the first cylinder and the second cylinder of the first piston assembly are each configured as an expansion cylinder or a compression cylinder;

(ii) providing a temperature difference between the fluidly connected expansion and compression cylinders, such that the pistons of each cylinder oscillate.

Embodiments of the third aspect of the present invention may include one or more features of the first or second aspects of the present invention or its embodiments. Similarly, embodiments of the first or second aspects of the present invention may include one or more features of the third aspect of the present invention or its embodiments.

According to a fourth aspect of the invention there is provided a Stirling engine comprising:

a first cylinder comprising a piston configured to separate at least two expansion or compression chambers of the first cylinder;

a second cylinder comprising a piston configured to separate at least two expansion or compression chambers of the second cylinder;

wherein the pistons of the first and second cylinders are connected, such that the first and second cylinders form a first piston assembly;

wherein each chamber of the first cylinder is fluidly connected to a chamber of a first cylinder of a second piston assembly such that a working fluid to be compressed/expanded can flow between the fluidly connected chambers of the first and second piston assemblies; and wherein each chamber of the second cylinder is fluidly connected to a chamber of a second cylinder of a third piston assembly such that a working fluid to be compressed/expanded can flow between the fluidly connected chambers of the first and third piston assemblies; and wherein each chamber of the second cylinder of the second piston assembly is fluidly connected to a chamber of a second cylinder of a fourth piston assembly such that a working fluid to be compressed/expanded can flow between the fluidly connected chambers of the second and fourth piston assemblies;

wherein the first cylinder and the second cylinder of the first piston assembly are each configured as an expansion cylinder or a compression cylinder.

Embodiments of the fourth aspect of the present invention may include one or more features of the first, second or third aspects of the present invention or its embodiments. Similarly, embodiments of the first, second or third aspects of the present invention may include one or more features of the fourth aspect of the present invention or its embodiments.

According to a fifth aspect of the invention, there is provided a system comprising a Stirling engine, the engine comprising:

a first cylinder comprising a piston configured to separate at least two expansion or compression chambers of the first cylinder;

a second cylinder comprising a piston configured to separate at least two expansion or compression chambers of the second cylinder;

wherein the pistons of the first and second cylinders are connected, such that the first and second cylinders form a first piston assembly;

wherein each chamber of the first cylinder is fluidly connected to a chamber of a first cylinder of a second piston assembly such that a working fluid to be compressed/expanded can flow between the fluidly connected chambers of the first and second piston assemblies; and wherein each chamber of the second cylinder is fluidly connected to a chamber of a second cylinder of a third piston assembly such that a working fluid to be compressed/expanded can flow between the fluidly connected chambers of the first and third piston assemblies; and wherein each chamber of the second cylinder of the second piston assembly is fluidly connected to a chamber of a second cylinder of a fourth piston assembly such that a working fluid to be compressed/expanded can flow between the fluidly connected chambers of the second and fourth piston assemblies;

wherein the first cylinder and the second cylinder of the first piston assembly are each configured as an expansion cylinder or a compression cylinder.

Embodiments of the fifth aspect of the present invention may include one or more features of the first, second, third or fourth aspects of the present invention or its embodiments. Similarly, embodiments of the first, second, third or fourth aspects of the present invention may include one or more features of the fifth aspect of the present invention or its embodiments.

According to a sixth aspect of the invention there is provided a method of operating an engine, the method comprising the steps of:

(i) providing: a Stirling engine comprising:

a first cylinder comprising a piston configured to separate at least two expansion or compression chambers of the first cylinder;

a second cylinder comprising a piston configured to separate at least two expansion or compression chambers of the second cylinder;

wherein the pistons of the first and second cylinders are connected, such that the first and second cylinders form a first piston assembly;

wherein each chamber of the first cylinder is fluidly connected to a chamber of a first cylinder of a second piston assembly such that a working fluid to be compressed/expanded can flow between the fluidly connected chambers of the first and second piston assemblies; and wherein each chamber of the second cylinder is fluidly connected to a chamber of a second cylinder of a third piston assembly such that a working fluid to be compressed/expanded can flow between the fluidly connected chambers of the first and third piston assemblies; and wherein each chamber of the second cylinder of the second piston assembly is fluidly connected to a chamber of a second cylinder of a fourth piston assembly such that a working fluid to be compressed/expanded can flow between the fluidly connected chambers of the second and fourth piston assemblies;

wherein the first cylinder and the second cylinder of the first piston assembly are each configured as an expansion cylinder or a compression cylinder.

(ii) providing a temperature difference between the fluidly connected expansion and compression cylinders, such that the pistons of each cylinder oscillate.

Embodiments of the sixth aspect of the present invention may include one or more features of the first, second, third, fourth or fifth aspects of the present invention or its embodiments. Similarly, embodiments of the first, second, third, fourth, or fifth aspects of the present invention may include one or more features of the sixth aspect of the present invention or its embodiments.

BRIEF DESCRIPTION OF THE DRAWINGS

The invention will now be described solely by way of example and with reference to the accompanying drawings in which.

DETAILED DESCRIPTION OF EMBODIMENTS

Figure 1:
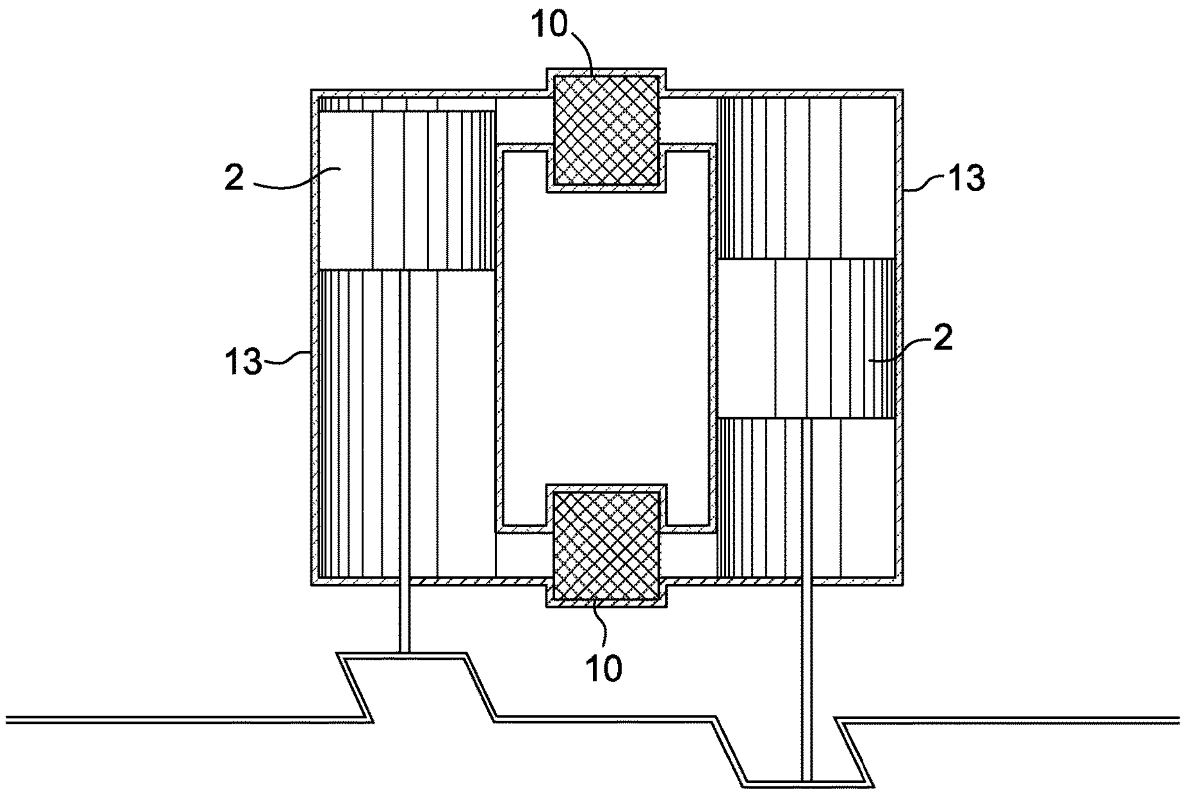
Fig. 1 Prior Art
FIG. 1 shows a Franchot type Stirling engine composed of an expansion cylinder and a compression cylinder connected by conduits and with double acting pistons separating two thermodynamic systems.

In some embodiments, the invention is an improved double acting alpha type Stirling engine device of the type whereby pairs of axially adjacent cylinders may bound pairs of expansible spaces which are separated by oscillating pistons. Each expansible space of a first cylinder of each pair is fluidly connected by conduits to an expansible space of a first cylinder of each pair such that two pairs of thermodynamic systems may be formed. Each expansible space of a second cylinder of each pair is fluidly connected by conduits to an expansible space of a second cylinder of each pair, such that two pairs of thermodynamic systems may be formed. Each double acting piston may be coaxially rigidly connected to at least one similar piston of another pair of cylinders and thermodynamic systems.

In some embodiments, at least four pairs of cylinders are fluidly and coaxially interconnected in a series loop (an example of a closed loop), whereby the specific number, order, distribution and interconnection of each pair of cylinders of the arrangement and method may permit the following: short and direct fluid connections between cylinders, the capability for cylinders to operate entirely as heat rejecters or as heat absorbers, the time variable mutually resonant, symmetric and cumulative oscillation of the pressure waves of each thermodynamic system and the mutually resonant oscillation of each piston assembly such that the device may be capable of free piston operation and may efficiently provide useful power. It will be understood that in other embodiments, the cylinders need not be pairs of cylinders, and any suitable number of cylinders can be employed. In some embodiments, the cylinders could be arranged in an open configuration, rather than a closed loop arrangement.

A large number of Stirling heat engine designs and concepts have been produced over recent decades, generally with little commercial success, despite the fact that, in principle. Stirling cycle heat engines have significant advantages over other external or internal combustion heat engines. They are quiet, they are able to utilise a wide range of fuels and heat sources, including waste heat, and they require lower maintenance cycles than internal combustion engines. The Carnot efficiency, which describes the maximum theoretical efficiency of external combustion heat engines, is also high compared to other devices. However, the theoretical Carnot cycle and equation also shows that the percentage of supplied energy which is theoretically possible for capture and conversion at the lower end of the temperature scale is small, making the design of an economic low temperature device problematic.

Thus the specific power density of a Stirling device is inherently relatively low at lower temperatures. To improve thermodynamic efficiencies, highly pressurised working fluid systems are generally employed, requiring expensive seals and robust containment. More importantly, bulky, expensive and complicated heat exchanger systems are necessary, and make up the major fraction of the cost of a typical device. Compared with high temperature heat source engines, the heat exchangers need to be of much larger size in order to achieve a particular engine power output, as the device requires a large surface area to permit sufficient heat transfer from the lower temperature source to the working gas, and also when rejecting the heat. The provision of high surface areas relative to volume for improved heat exchange, for instance in the form of large numbers of narrow tubes, will tend to increase fluid friction and pumping losses. The pumping losses may be further increased due to the necessarily long and sometimes indirect paths of the combined heat exchanger and regenerator assemblies which connect the hot to cold side spaces and which are typical of many Stirling cycle systems, examples of which can be seen in FIGS. 2 and 3 of the Prior Art. Thus, whereas for a high temperature device the pumping losses are small relative to power output, fluid friction represents a main loss mechanism within low temperature devices.

Another significant design challenge associated with lower temperature devices is the provision of an effective thermal separation between the hot expansion spaces and the cool compression spaces. For low temperature devices the temperature difference between the hot and cold sides of each thermodynamic system is already small, and so it is therefore essential to ensure that the highest possible temperature gradient is maintained through design. For double acting arrangements in which cylinders contain both hot and cold spaces separated by double acting pistons, expensive thermal breaks are typically needed between the top and bottom cylinder casings and within pistons in order to minimise axial thermal conduction losses.

Double acting Stirling based heat engines have been proposed which attempt to maximise power densities and working efficiencies, the most relevant of which are described below.

Figure 4:
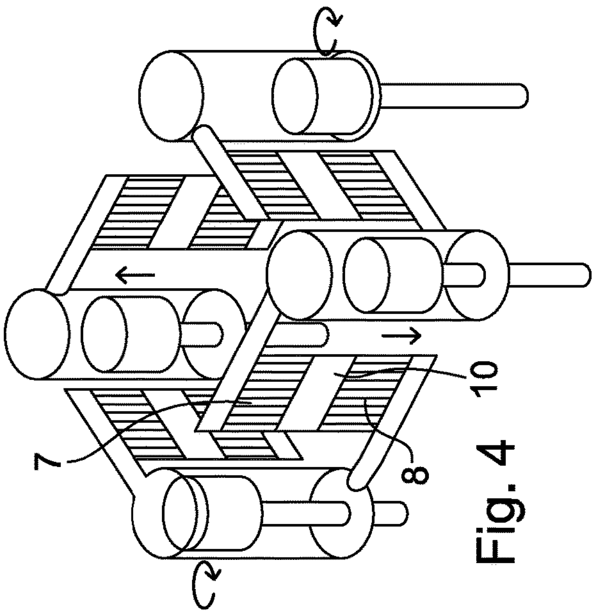
FIG. 4 shows a three dimensional view of the time variable disposition of phase angles of the pistons of a four cylinder Siemens/Rinia double acting arrangement in a series loop.
Figure 3:
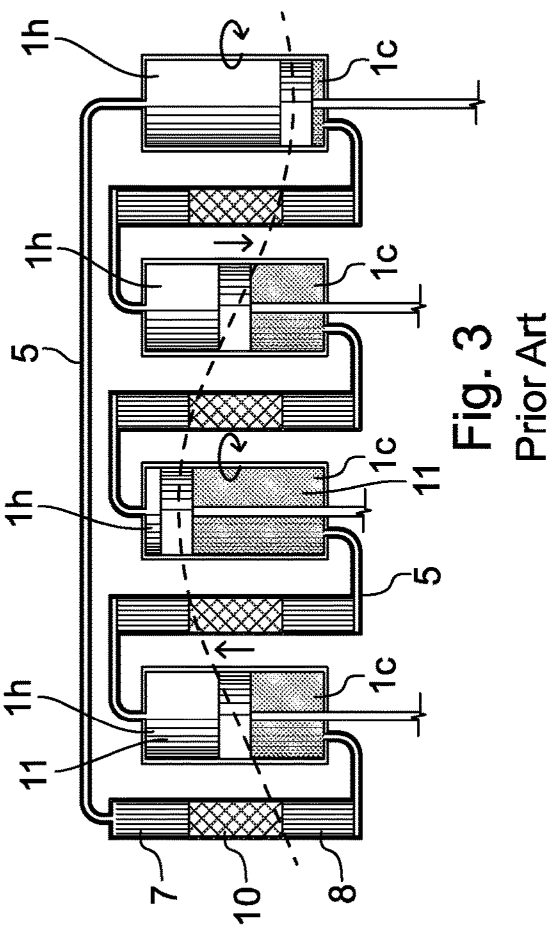
Fig. 3 Prior Art
FIG. 3 shows the time variable disposition of the phase angles of the pistons of a four cylinder Siemens/Rinia double acting arrangement in a series loop.
Figure 5:
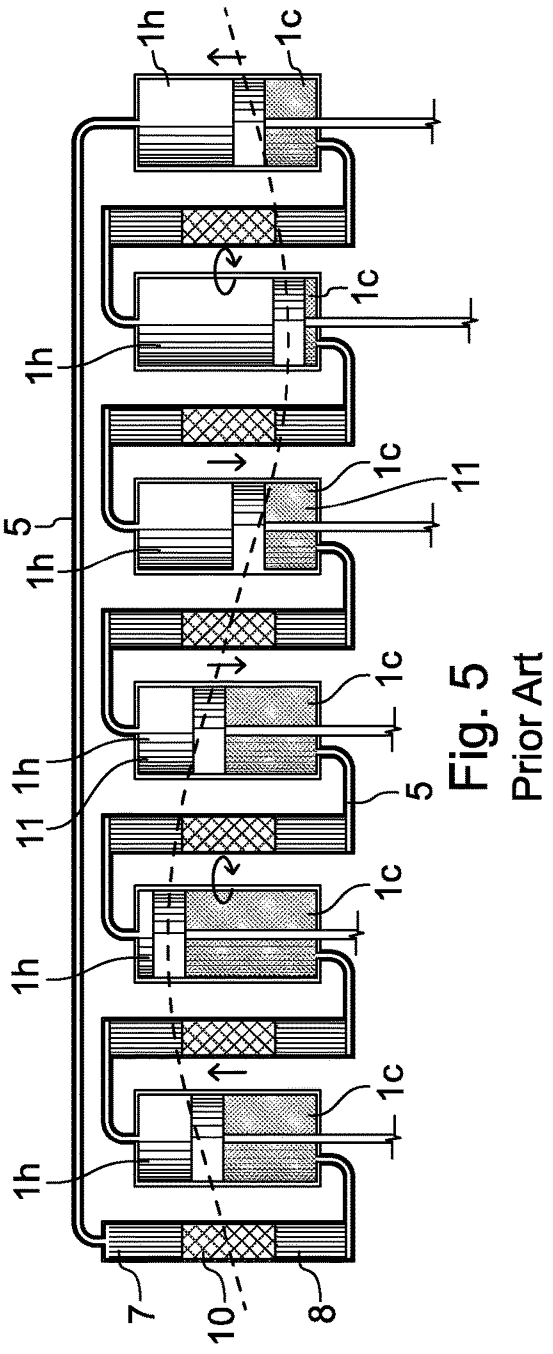
Fig. 5 Prior Art
FIG. 5 shows the time variable phase angles of the pistons of a six cylinder Siemens/Rinia double acting arrangement in a series loop.

The Siemens Rinia arrangement of FIGS. 3, 4 & 5, which is familiar to those skilled in the art of external combustion engines, is composed of a series of connected double acting cylinders whereby the expansion space 1*h* of one cylinder is connected to the back of the compression space 1*c* of the following cylinder such that the cylinders are connected in series in a closed series loop of a minimum of three thermodynamic systems separated by double acting reciprocating pistons. As is typical for series connected Stirling engines, the working gas cyclically flows between the expansion space to the compression space by means of a conduit 5 which is typically composed of two heat exchangers each side of a regenerator 10. A first heat exchanger 7 is connected to the expansion space and applies heat to the working gas and the second heat exchanger 8, which is connected to the compression space, removes rejected heat from the working gas. The regenerator typically contains a mesh matrix which is capable to rapidly absorb or reject heat and is known from prior art to substantially improve the overall efficiency of the device.

However, The Siemens Rinia arrangement has certain inherent shortcomings when applied to lower temperature operation. Because an expansion and compression space are contained within each cylinder, long pistons and cylinders, preferably incorporating thermal breaks, are generally deployed in order that thermal conduction may be reduced and axial conduction losses may be minimised. The connecting conduits, which typically incorporate heat exchangers and regenerator assemblies, follow a path from the head of one cylinder to the base of the following cylinder are therefore also necessarily long. The consequence for lower temperature operation is high pumping and pressure losses and expensive and complicated heat exchanger assemblies, and with a low specific power density.

Figure 2:
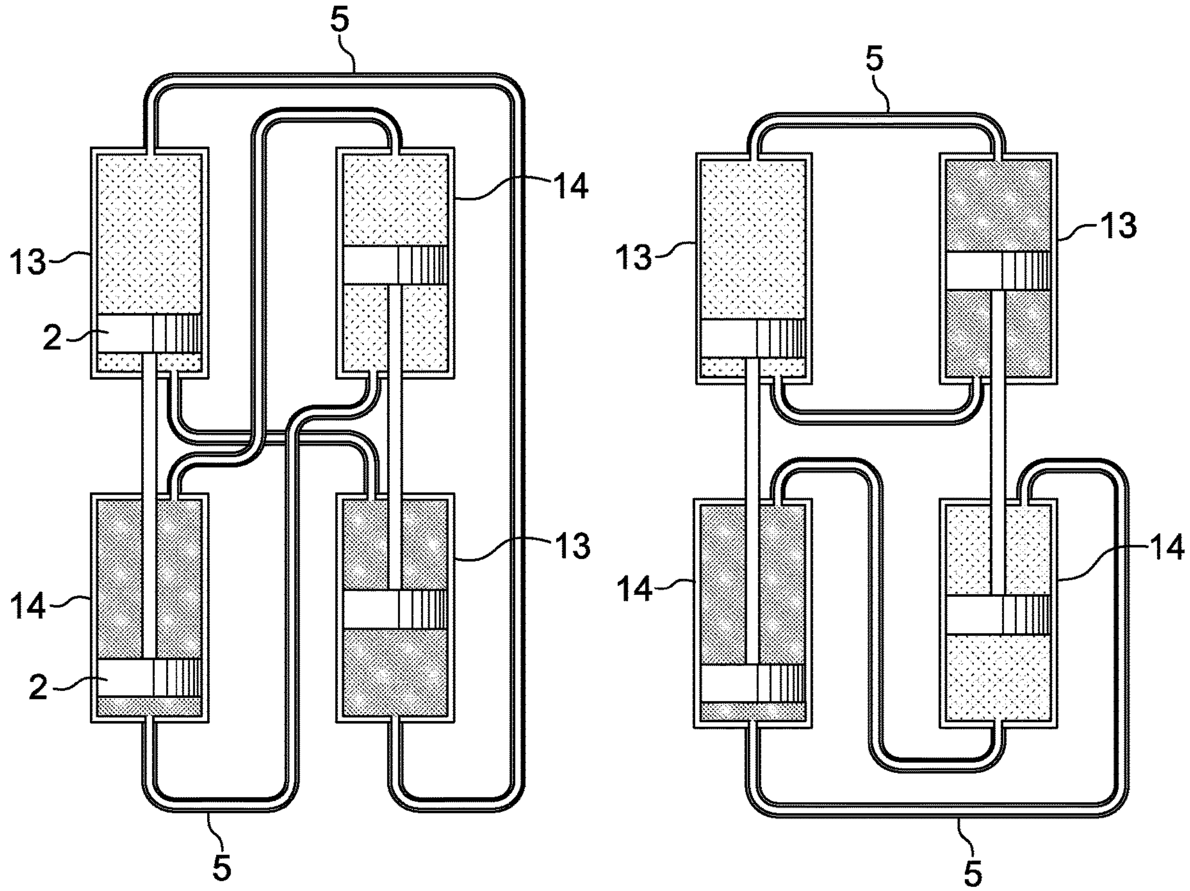
Fig. 2 Prior Art
FIG. 2 shows two embodiments of a compounding Finkelstein arrangement with connecting ducts and with piston rods connecting the pistons within the expansion and compression cylinders.

The Finkelstein double acting multi-cylinder arrangement of FIG. 2, which was devised in the late 1970's, offers an improved double acting heat engine with a similar power density as the Siemens arrangement, through the deployment of compounding assemblies of rigid rods connecting double acting piston cylinders and multiple thermodynamic systems. The design has never been developed commercially because of similar problems as those found in the Siemens Rinia arrangement. As is known by those skilled in the art, the separate and directly heated and cooled cylinders and associated pairs of thermodynamic systems as represented by the Franchot arrangement of FIG. 1 cannot be successfully deployed in the balanced compounding arrangement of the Finkelstein arrangement FIG. 2 due to the long, irregular and dissimilar regenerator and heat exchanger connections. It can be seen from FIG. 2 that the conduits 5 which fluidly connect each expansion and compression space are of unequal length, are of irregular configuration and are generally excessively long and circuitous. As a result, each thermodynamic system has different characteristics and inbuilt inefficiencies due to excessive and variable dead space, resulting in an unbalanced and non-symmetric operation. The long and crossing paths of each connecting conduit, which would typically include heat exchanger and regenerator assemblies, can be expected to result in high pumping losses and in very high fabrication costs. The demounting of the heat exchanger assemblies for cleaning and maintenance can also be expected to be highly problematic.

In some embodiments of the Finkelstein arrangement, and similarly to the Siemens Rinia arrangement, the cooling compression spaces and heating expansion spaces are deployed within the same cylinder on each side of the double acting reciprocating piston. The conduits therefore connect the upper expansion space of one cylinder to the lower compression space of a following cylinder in order to provide fluidly linked thermodynamic systems. In these embodiments the pistons and cylinders are typically long in order to provide an adequate thermal separation between the expansion and compression spaces, and with a thermal break separating the top and bottom parts of each piston and cylinder. Elongated and thermally broken cylinders and pistons tend to reduce power densities and increase the expense of these components. The conduits which fluidly connect the top of one cylinder to the bottom of the following cylinder are, similarly to the cylinders, also necessarily long and complex, with consequent high pumping or shuttle losses, excess dead space and high fabrication costs.

Thus, for practical and economic reasons, the only significant deployment of Stirling based thermodynamic systems in recent years has been within small scale combined heat and power and concentrated solar reflector arrays, and in which working fluid temperatures are typically relatively high.

In at least some embodiments, the invention is designed to addresses and resolves these fundamental issues, and also is capable of free piston operation and the provision of embodiments with different thermodynamic phase angles such that high and low temperature operation is available, and such that the balance of power and efficiency may be optimised.

In some embodiments, a plurality of thermodynamic systems are enclosed within double acting cylinders which are interconnected by rigid reciprocating piston assemblies in specific configurations or arrays such that short and equal conduits can fluidly connect axially adjacent thermodynamic spaces in a series loop such that pumping losses and fluid friction are minimised. In some embodiments, the conduits may be composed of connected heat exchanger and regenerator assemblies which are identical and which use common parts which are inexpensive to manufacture. It will be understood that in other embodiments, other fluid connections between cylinders are possible. In some embodiments, the provided heat exchanger and regenerator assemblies may be easily dismantled for cleaning and maintenance, which is of particular value and importance when the heat source is geothermal brine or industrial waste heat with a heavy contaminant load.

In some of the embodiments, the provided configurations may be composed of cylinders that are either entirely heat absorbers or heat rejecters such that coaxial thermal conduction losses may be negated, and which are capable to be distributed and thermally isolated, one from the other, in order that thermal losses may be minimised and the area of heat transfer may be maximised. As well as optimising heat exchange efficiencies, such an arrangement negates the requirement for thermal breaks within cylinders and pistons, and for long cylinder and piston configurations, improving power densities and economic viability. Because the hot and cold expansible spaces of each thermodynamic cycle are adjacent, heat exchanger designs may be similar, straight and relatively simple, and may be optimised to minimise pumping losses and dead space. In other embodiments, different arrangements of cylinders may be used.

In some embodiments, each thermodynamic system may therefore possess similar time variable characteristics of temperature, volume and pressure, and so the provided device may generate symmetric and regular thermodynamic pressure cycles such that some embodiments may be capable of free piston operation. In some circumstances, the capability for free piston operation is thought to be of considerable value and importance for the efficient operation of an economic device with low maintenance cycles. Free piston arrangements provide the benefits of low side forces acting on piston rods, seals and bearings and greatly reduced wear and friction as a result of the absence of a crank mechanism. By deploying linear alternators as the power take off mechanism it is also possible to hermetically seal the entire device against gas leakage, negating expensive piston rod seals and bearings and the associated higher maintenance cycles. It is known by those skilled in the art that the Siemens Rinia arrangement is not considered suitable for free piston operation because the pressure peaks of the oscillating pressure cycles are asymmetrically spaced over time and are insufficiently close for regular and smooth operation. It will be appreciated that some embodiments of the invention may use a different piston configuration.

An important benefit of some embodiments is that it is so configured such that the thermodynamic phase angle may be changed by the addition or removal of two pairs of interconnected cylinders. For a double acting alpha arrangement that is designed to be configured for low temperature operation, the thermodynamic phase angle is a critical design parameter, as the balance of the power and efficiency of the arrangement are to a large extent a function of this angle.

The phase angle of the arrangement (a) describes the amount by which the expansion volume leads the compression volume and the relationship of these spaces to piston motion. Higher phase angles result in an improved efficiency but lower power. A lower phase angle will produce a higher compression ratio, which will cause an adiabatic temperature increase in the working fluid such that it becomes more difficult for the device to add and reject heat within a low temperature device. For a low temperature device, a high compression ratio may increase the temperature of the working fluid to close that of the heat source, reducing efficiencies substantially.

For a double acting alpha type engine, the phase angle is a function of the number of cylinders.

So, for a for a typical four cylinder Siemens Rinia device, if Nc is the number of cylinders then the phase angle between interconnected hot and cold volumes will be as follows:

$$\alpha = \pi - \frac{2\pi}{Nc} = 180^\circ - \frac{360^\circ}{4} = 90^\circ$$

Therefore, for a low temperature device it is preferable to reduce the compression ratio and to increase the volume of gas that is shuttled from the compression and expansion spaces by increasing the phase angle, such that more gas is heated during expansion, and more gas is cooled during compression and the convective heat transfer coefficient is improved. However, this results in smaller variations in volume and so lower pressure amplitudes, so that higher cylinder numbers and phase angle will tend to result an increase in efficiency but a decrease in power.

The phase angle and mutually resonant operation of the thermodynamic systems of the provided arrangement is determined by the order and disposition of the fluidly connecting conduits and piston assemblies and by the order of piston motion. Depending on the configuration and number of cylinders, various embodiments of the provided device are available, which are capable of high and lower temperature operation. The optimum phase angle for a low temperature device will generally be between 120° and 150° degrees whereas for a high temperature device the optimum phase angle may be closer to 90° and a consequently much higher compression ratio.

By adding cylinders to embodiments of the provided arrangement in pairs of two thermodynamic systems, the phase angle can be incrementally increased, such that, for instance, an eight cylinder device produces a phase angle of 90° and is suitable for higher temperature power generation, and a twelve cylinder device may provide 120° phase angle and may operate more efficiently using low temperature heat sources. An embodiment of the provided arrangement with eight interconnected cylinders of four pairs of thermodynamic systems may provide a power density and phase angle which is approximately equivalent to two of the four-cylinder Siemens Rinia arrangements and which, because it is compounded, may be capable of free piston operation. It will be understood that other methods of permitting free-piston operation and altering the phase angle may be employed.

In some embodiments, a plurality of pairs of double acting thermodynamic systems may therefore be deployed in various interconnected arrays composed of a minimum of eight cylinders, which may be capable to provide embodiments of the arrangement which may efficiently operate at either high or lower temperatures and which may provide a symmetric, smooth and efficient transmission of power.

In other embodiments, any suitable number of cylinders may be used. Identical, short and direct connecting conduits composed of heat exchanger and regenerator assemblies may greatly reduce pumping losses, may permit the use of common parts, and may substantially reduce the costs of manufacture. They may also ensure that the thermodynamic characteristics of each Stirling cycle may be cyclically similar and symmetric over time, such that the time variable pressures generated by the thermodynamic cycles may be approximately equal, balanced and cumulative and may be capable of free piston operation. It will be understood that other ways of fluidly connecting cylinders may be used.

The present invention will now be described. Without wishing to be bound by theory, the embodiments of the invention as described herein result in at least some of the following: provide an improved heat engine that may accommodate comparatively low production costs: permit inexpensive installation, inspection, maintenance and repair: provide a high power density relative to engine size and temperature differentials: be economically fitted or retrofitted into existing factory or other power plant systems for the extraction and conversion of waste heat to electrical energy: be capable to convert thermal energy from a wide range of temperatures and heat sources, including from lower temperature heat sources, into electrical energy; and be capable to operate as a cooling device or cryocooler.

With reference to FIGS. 6 to 17, embodiments of a Stirling engine 100 (an example of a heat energy conversion device) are illustrated and described herein. As shown schematically in FIG. 17, the engine 100 comprises a first cylinder 13*a* comprising a piston 2 configured to separate at least two expansion or compression chambers 11*a*', 11*a*" of the first cylinder 13*a*. The engine 100 comprises a second cylinder 14*a* comprising a piston 2 configured to separate at least two expansion or compression chambers 12*a*', 12*a*" of the second cylinder 14*a*. The pistons 2 of the first and second cylinders 13*a*, 14*a*, are connected, such that the first and second cylinders 13*a*, 14*a*, form a first piston assembly 16*a*.

Each chamber 11*a*', 11*a*" of the first cylinder 13*a* is fluidly connected to a chamber 11*b*, 11*b*" of a first cylinder 13*b* of a second piston assembly 16*b* such that a working fluid to be compressed/expanded can flow between the fluidly connected chambers 11*a*' and 11*b*', and 11*a*" and 11*b*", of the first and second piston assemblies 16*a*, 16*b*.

Each chamber 12*a*', 12*a*" of the second cylinder 14*a* is fluidly connected to a chamber 12*c*', 12*c*" of a second cylinder 14*c* of a third piston assembly 16*c* such that a working fluid to be compressed/expanded can flow between the fluidly connected chambers 12*a*' and 12*c*', and 12*a*" and 12*c*" of the first and third piston assemblies 16*a*. 16*c*.

Each chamber 12*b*', 12*b*" of the second cylinder 14*b* of the second piston assembly 16*b* is fluidly connected to a chamber 12*d*', 12*d*" of a second cylinder 14*d* of a fourth piston assembly 16*d*, such that a working fluid to be compressed/expanded can flow between the fluidly connected chambers 12*b*' and 12*d*', 12*b*" and 12*d*" of the second and fourth piston assemblies 16*b*, 16*d*.

Figure 15:
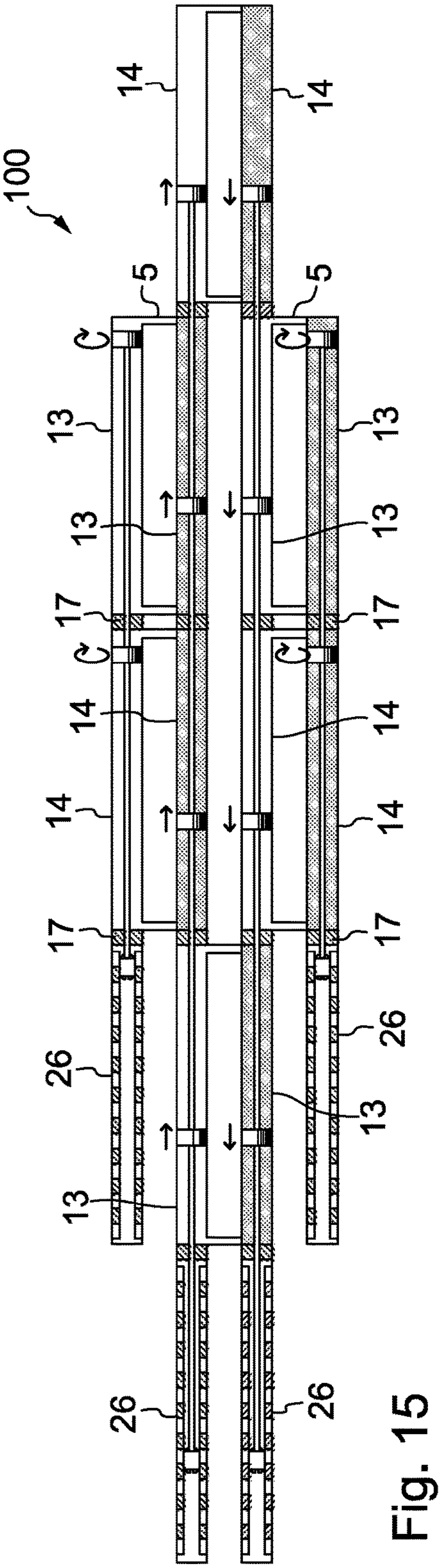
FIG. 15 shows a further twelve cylinder embodiment with a different distribution of extended expansion and compression cylinders and which shows the direction of movement and the phase angles of the pistons of each thermodynamic system, and shows an alternator connected to each piston shaft.
Figure 16:
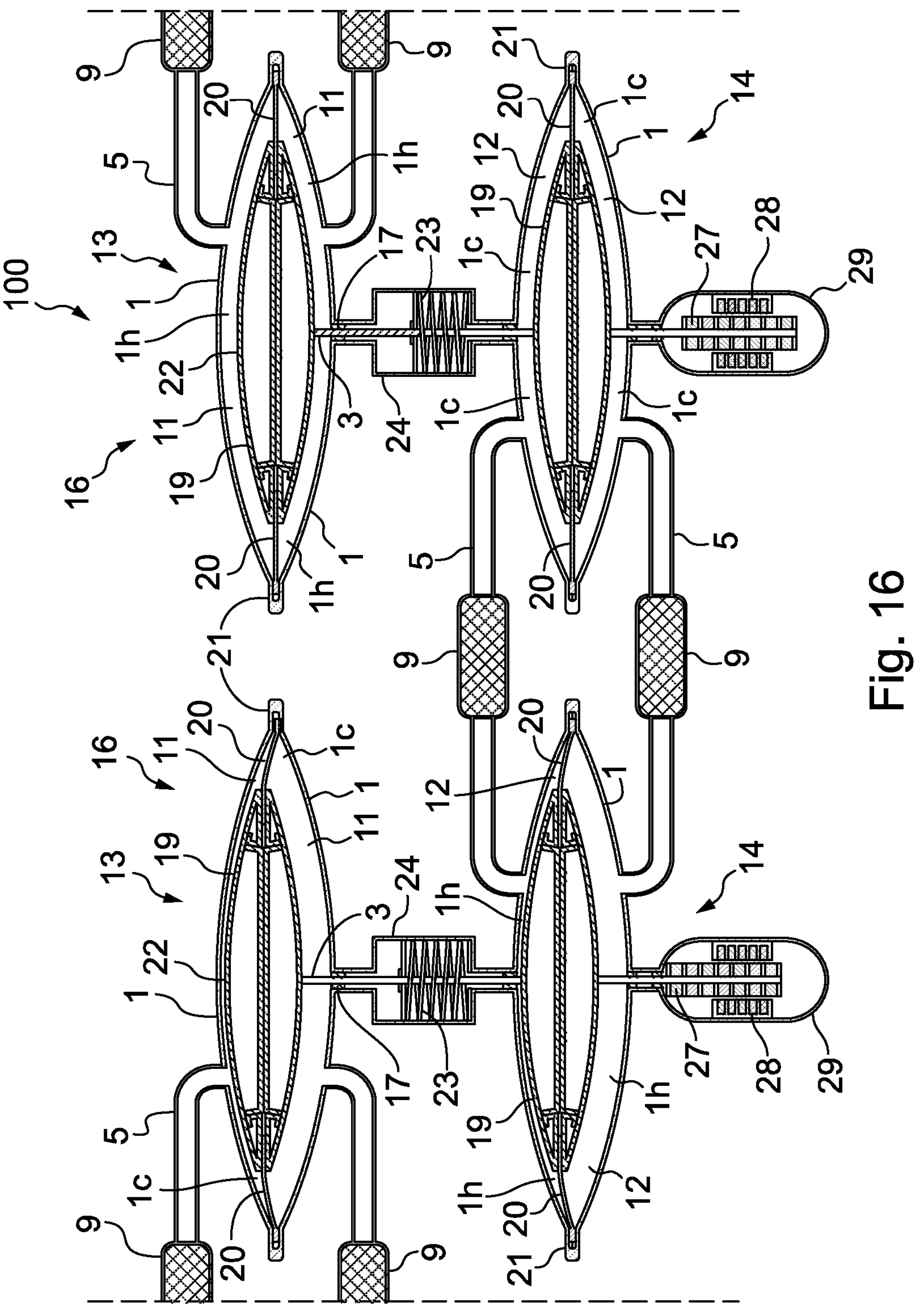
FIG. 16 shows an embodiment wherein the compounded and oscillating free pistons are diaphragm pistons composed of an elastomeric annulus fixed to a rigid disc.
Figure 17:
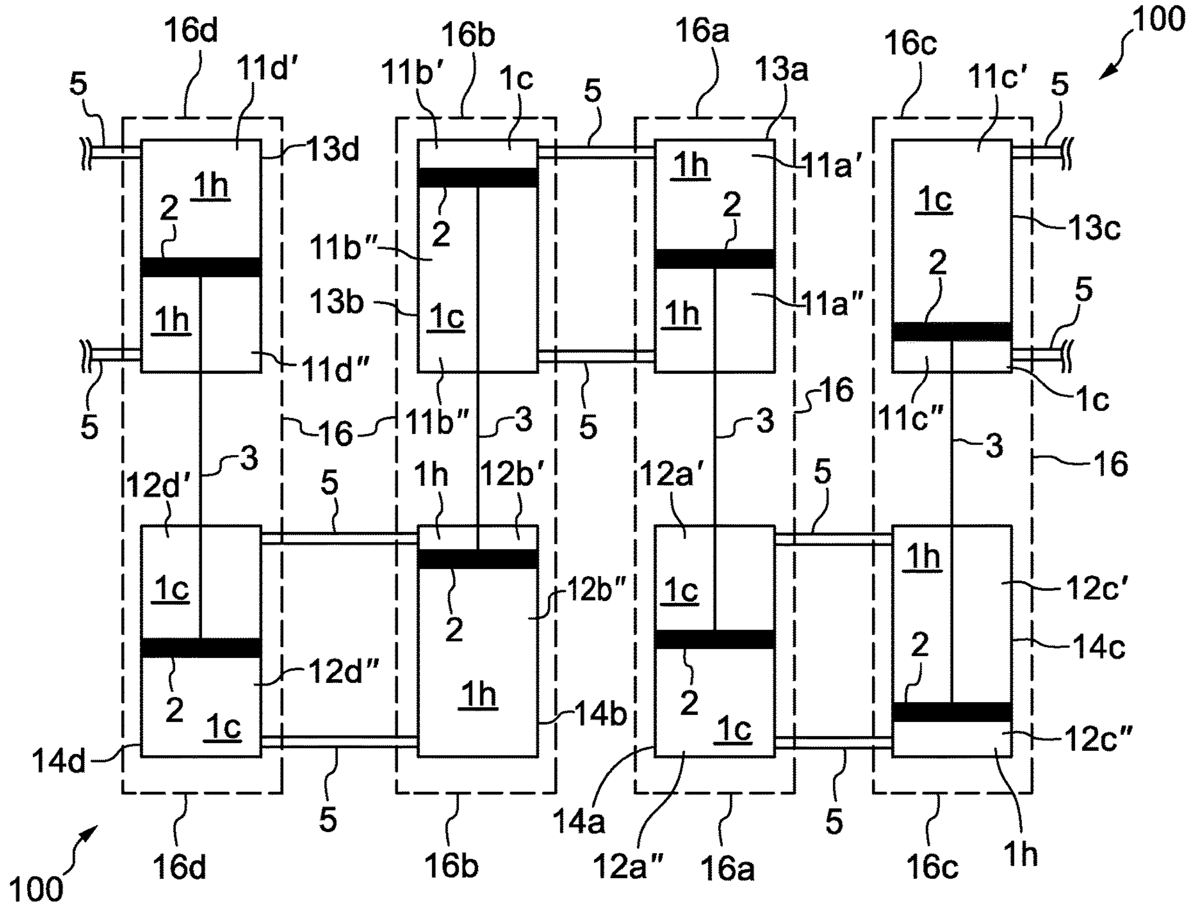
FIG. 17 shows a schematic illustration of an embodiment of the invention, illustrating the distribution of expansion and compression cylinders.

In the embodiments illustrated in FIGS. 6 to 17, and as shown schematically in FIG. 17 each first cylinder 13*a*, 13*b*, 13*c*, 13*d* of each piston assembly 16*a*, 16*b* 16*c*, 16*d* is configured as an expansion cylinder 1*h*, or as a compression cylinder 1*c*, and each second cylinder 14*a*, 14*b*, 14*c*, and 14*d* of each piston assembly 16*a*. 16*b*, 16*c*, 16*d* is configured as an expansion cylinder 1*h* or as a compression cylinder 1*c*. In these embodiments, the first and second cylinders 13, 14, of each piston assembly 16 are configured to be the opposite type of expansion/compression cylinder to each other. If the first cylinder 13 of a piston assembly 16 is an expansion cylinder 1*h*, the second cylinder 14 of the same piston assembly 16 would be a compression cylinder 1*c*, or vice versa. The first cylinder 13 of each piston assembly 16 is configured to be the opposite type of expansion/compression cylinder to the cylinder to which it is fluidly connected. For example, in FIG. 17, cylinders 13*a* and 13*b* are of opposite types, cylinder 13*c* would be the opposite type to the cylinder to which it is connected, which could be cylinder 13*d*, or another cylinder. Likewise, the second cylinder 14 of each piston assembly 16 is configured to be the opposite type of expansion/compression cylinder to the cylinder to which it is fluidly connected.

In these embodiments, the chambers 11 of each first cylinder 13 are each expansion spaces 1*h*, or are each compression spaces 1*c*, depending on whether the cylinder is an expansion 1*h* or compression cylinder 1*c*, and the chambers 12 of each second cylinder 14 are each expansion spaces 1*h* or are each compression spaces 1*c*, depending on whether the cylinder is an expansion or compression cylinder.

It will be understood that in these embodiments, each cylinder is a "hot" cylinder 1*h* or a "cold" cylinder 1*c*, and each cylinder does not have a combination of expansion and compression spaces (as is common in some types of Stirling engine).

It will be appreciated that in some embodiments the first cylinder 13*a* of the first piston assembly 16*a* is configured to be an expansion cylinder 1*h* and the second cylinder 14*a* of the first piston assembly 16*a* is configured to be a compression cylinder 1*c*, which determines the sequence of expansion-compression cylinders throughout the engine 100, or vice versa, with the first cylinder 13*a* of the first piston assembly 16*a* being a compression cylinder 1*c*.

The first and second cylinders 13, 14, of each piston assembly 16 are fluidly isolated from each other.

For example, the first cylinder 13*a* is fluidly isolated from the second cylinder 14*a*.

The chambers 11 of the first cylinder 13 of each piston assembly 16 are fluidly isolated from the chambers 12 of the second cylinder 14 of the piston assembly 16.

The at least two chambers 11*a*', 11*a*" of the first cylinder 13*a* are each expansion 1*h* or compression spaces 1*c*. The at least two chambers 12*a*', 12*a*" of the second cylinder 14*a* are each expansion 1*h* or compression spaces 1*c*.

The Stirling engine 100 is a double acting, multiphase alpha Stirling engine.

It will be understood that the engine 100 could be used to convert mechanical movement of the pistons to extract heat from an environment or system, such that the engine 100 could operate as a cooling device or cryocooler.

In the embodiment shown in FIG. 17, the engine 100 comprises four piston assemblies 16*a*, 16*b*, 16*c*, 16*d*, with the possibility of further, additional piston assemblies being connected thereto, as indicated on the left and right of the figure. Any suitable number of piston assemblies 16 can be used. The, or each additional piston assembly 16 can be arranged such that the first cylinders 13 thereof are fluidly connected to a first cylinder 13 of a piston assembly 16 of the engine 100 and such that the second cylinders 14 thereof are fluidly connected to a second cylinder 14 of another piston assembly 16 of the engine. The, or each additional piston assembly 16 can have a piston connection between the first and second cylinders 13, 14, thereof. In this arrangement, any suitable number of piston assemblies 16 can be arranged in sequence.

In the embodiments illustrated and described here, the piston assemblies 16 are identical, although in other embodiments they may be different.

As shown in FIG. 17, each cylinder 13, 14, of each piston assembly 16, comprises a piston 2 configured to separate two expansion/compression chambers 11, 12, of the cylinder. In other embodiments, there could be more than two chambers 11, 12, in each cylinder, separated by one or more pistons 2.

The pistons 2 of the first and second cylinders 13, 14, of each piston assembly 16 are connected.

Figure 8:
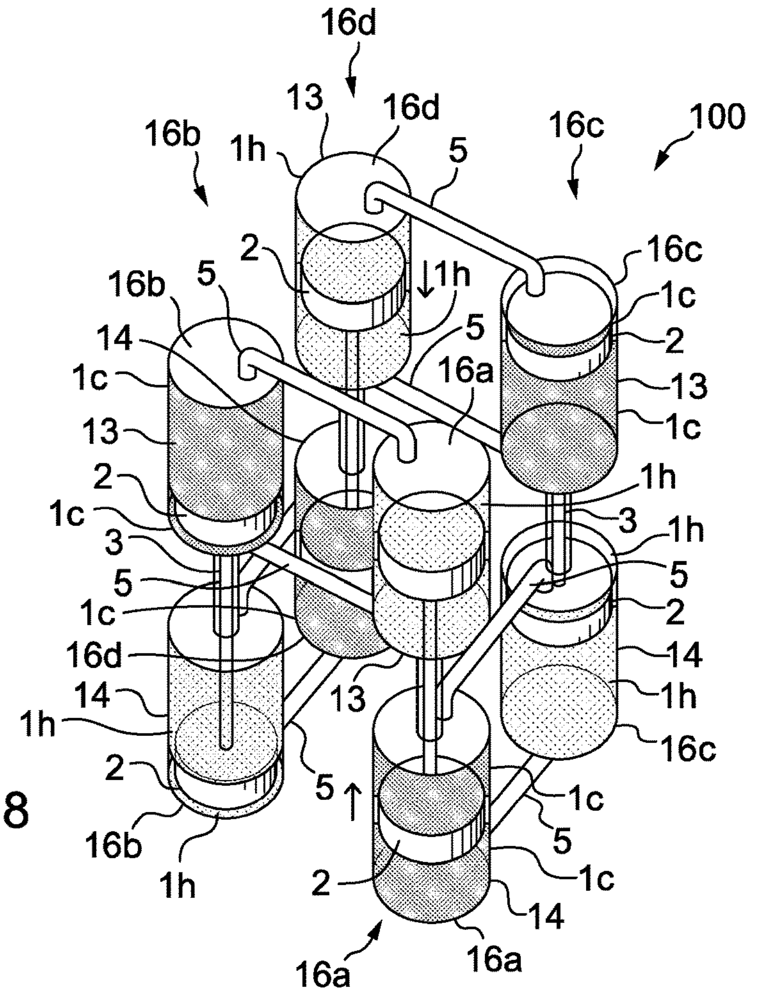
FIG. 8 shows a three dimensional view of an eight cylinder embodiment of the device, including the distribution of expansion and compression cylinders.
Figure 12:
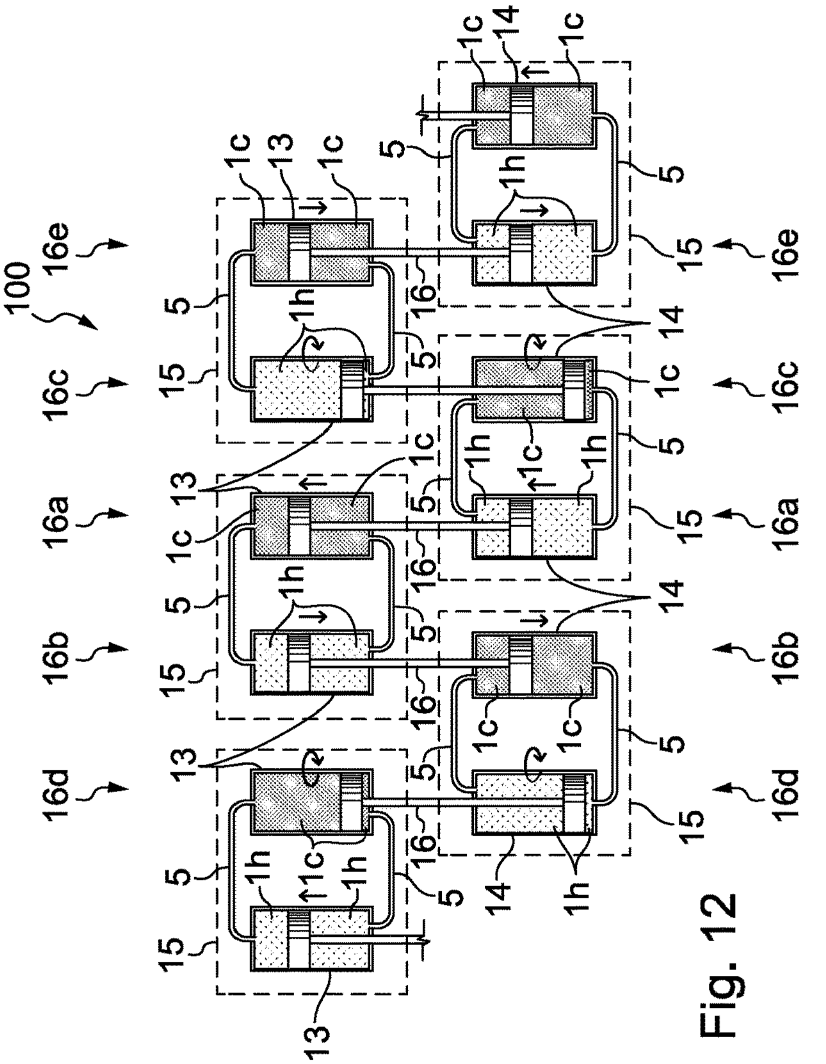
FIG. 12 shows a sectional elevation of a twelve cylinder embodiment of the device, including the distribution of expansion and compression cylinders, the distribution piston phase angles and the direction of piston movement.

Each chamber 11*c*', 11*c*" of a first cylinder 13*c* of the third piston assembly 16*c* can be fluidly connected to a chamber 11 of a first cylinder 13 of a fifth piston assembly 16*e* (as shown in FIG. 12) such that a working fluid to be compressed/expanded can flow between the fluidly connected chambers 11 of the third 16*c* and fifth piston assemblies 16*e*, or as shown in FIG. 8, each chamber 11*d*', 11*d*" of the first cylinder 13*d* of the fourth piston assembly 16*d* can be fluidly connected to a chamber 11*c*', 11*c*" of a first cylinder 13*c* of the third piston assembly 16*c*.

As shown in FIG. 8, the engine 100 can be configured in a closed loop arrangement. In this arrangement, the engine comprises at least four piston assemblies 16*a*, 16*b*, 16*c*, 16*d*, with all cylinders 13, 14, having fluid connections to another cylinder 13, 14, of the engine 100. For example, the fourth piston assembly 16*d* can be connected to the third piston assembly 16*c* in a sequence: 1, 3, 4, 2, then back to 1, and it will be understood that the sequence depends on the number of piston assemblies 16 employed. For 8 piston assemblies, the sequence could be: 1, 3, 5, 7, 8, 6, 4, 2, and back to 1.

It will be understood that the engine 100 can be configured in an open loop. In this arrangement, there may be end piston assemblies 16. For example, in FIG. 17, the end piston assemblies 16 could be the third 16*c* and fourth 16*d* piston assemblies, the fourth 16*d* and fifth piston assemblies 16*e*, or any subsequent piston assemblies.

Each odd numbered piston assembly 16*a*, 16*c*, etc, can be fluidly connected to an even numbered piston assembly 16*b*, 16*d*, etc. In this example, the chambers 11 of each first cylinder 13 of each even numbered piston assembly 16*b*, 16*d*, are fluidly connected to the chambers 11 of a first cylinder 13 of an odd numbered piston assembly 16*a*, 16*c*. The chambers 12 of each second cylinder 14 of each even numbered piston assembly 16*b*, 16*d*, are fluidly connected to the chambers 12 of a second cylinder 14 of an odd numbered piston assembly 16*a*, 16*c*.

As shown in FIG. 17, the engine 100 is configured such that the first and second cylinders 13, 14, of each piston assembly 16 are fluidly connected to different piston assemblies (the first cylinder 13*a* being fluidly connected to piston assembly 16*b*, with second cylinder 14*a* being fluidly connected to piston assembly 16*c*).

The term "cylinder" is used to convey its function within an engine, and is not an indication of its shape. It will be understood that each cylinder may take any suitable shape and form. Each cylinder may be substantially cylindrical, or any other suitable shape, such as cuboidal, ovoidal, or the like.

Each cylinder 13, 14, is a substantially rigid cylinder 13, 14. Each cylinder 13, 14, is spaced apart from the other cylinders 13, 14.

In the embodiments illustrated and described here, the piston 2 of each cylinder 13, 14, is configured to fluidly isolate each chamber 11, 12, of the cylinder 13, 14, from the other chamber 11, 12, of the cylinder 13, 14.

With reference to FIG. 17, each of the first cylinders 13*a*, 13*b*, 13*c*, 13*d* comprises a first chamber (11*a*', 11*b*, 11*c*', 11*d*') and a second chamber (11*a*", 11*b*", 11*c*", 11*d*"), and each of the second cylinders 14 comprises a first chamber (12*a*', 12*b*', 12*c*', 12*d*') and a second chamber (12*a*", 12*b*", 12*c*", 12*d*"). As shown in FIG. 17, the first chamber 11*a*' of the first cylinder 13*a* is fluidly connected to the first chamber 11*b*' of the first cylinder 13*b*. The second chamber 11*a*" of the first cylinder 13*a* of the first piston assembly 16*a* is fluidly connected to the second chamber 11*b*" of the first cylinder 13*b* of the second piston assembly 16*b*. FIG. 17 illustrates the fluid connections between each of the first and second chambers.

Each first chamber of each cylinder is fluidly isolated from the second chamber of that cylinder. For example, the first chamber 11*a*' is fluidly isolated from second chamber 11*a*" of cylinder 13*a* (FIG. 17).

Each of the fluidly connected chambers has a fluid flow path therebetween for the working fluid, and in the embodiments illustrated and described here, the fluid flow path is implemented by fluid conduits 5. In the embodiments shown here, the fluid flow paths provided by the conduits 5 are substantially identical. In other embodiments, this may not be required, but as described in more detail below, it is thought to be advantageous.

In the embodiments illustrated and described here, the fluid connections between each first cylinder 13 are configured such that the fluid flow path between the first chambers is substantially equal in length to the fluid flow path between the second chambers. The fluid connections between each second cylinder 14 are configured such that the fluid flow path between the first chambers is substantially equal in length to the fluid flow path between the second chambers.

The fluid flow path between the first chambers 11*a*', 11*b*', of the first and second piston assemblies 16*a*, 16*b*, are configured to be substantially equal in length to the fluid flow path between the second chambers 11*a*", 11*b*" of the first and second piston assemblies 16*a*, 16*b*. The fluid flow path between the first chambers 12*a*', 12*c*' of the first and third piston assemblies 16*a*, 16*c*, are configured to be substantially equal in length to the fluid flow path between the second chambers 12*a*", 12*c*" of the first and third piston assemblies 16*a*, 16*c*.

The engine 100 comprises a plurality of fluid conduits 5 for fluidly connecting the chambers of the cylinders. The fluid conduits 5 can take any suitable form and shape, and it will be understood that single or multiple fluid conduits 5 can be used to fluidly connect the chambers of the cylinders.

In this embodiment, each of the fluid conduits 5 connecting the chambers of the fluidly connected first cylinders 13 are substantially identical, and each of the fluid conduits connecting the chambers of the fluidly connected second cylinders 14 are substantially identical.

As shown in FIGS. 6 to 9, at least a portion of each of the fluid conduits 5 connecting the chambers of the fluidly connected first cylinders 13 are arranged to be substantially parallel, and at least a portion of each of the fluid conduits 5 connecting the chambers of the fluidly connected second cylinders 14 are arranged to be substantially parallel.

The fluidly connected first cylinders 13 include substantially parallel fluid conduits 5, or substantially parallel fluid conduit portions and each of the fluidly connected second cylinders 14 includes substantially parallel fluid conduits 5.

The engine 100 is configured such that every expansion cylinder 1*h* is fluidly connected to a compression cylinder 1*c*. The engine 100 is configured such that the chambers of each expansion cylinder 1*h* are fluidly connected to the chambers of a compression cylinder 1*c*.

The engine 100 is configured to have only expansion cylinders 1*h* and compression cylinders 1*c*, and the embodiments illustrated and described here the engine 100 does not include any cylinders that have both an expansion space 1*h* and a compression space 1*c*. Each cylinder can be either entirely "hot" or entirely "cold".

The engine 100 is operable to apply heating to the expansion cylinders 1*h* of the engine 100 and cooling to the compression cylinders 1*e* of the engine, as described in more detail below.

Each piston 2 is a double acting, reciprocating piston 2 and the engine 100 is configured to permit free-piston operation.

In the embodiments illustrated and described here, each cylinder comprises a single piston 2, but in other embodiments two or more pistons 2 within each cylinder could be used.

Each piston 2 comprises a piston head, which is rigid and configured to form a seal between a wall 1, or walls, of the cylinder and the piston head.

The working fluid is a gas, which in this embodiment is air. However, hydrogen or helium, or any suitable gas can be used for the working fluid, and in some embodiments liquid could be used.

Figure 13:
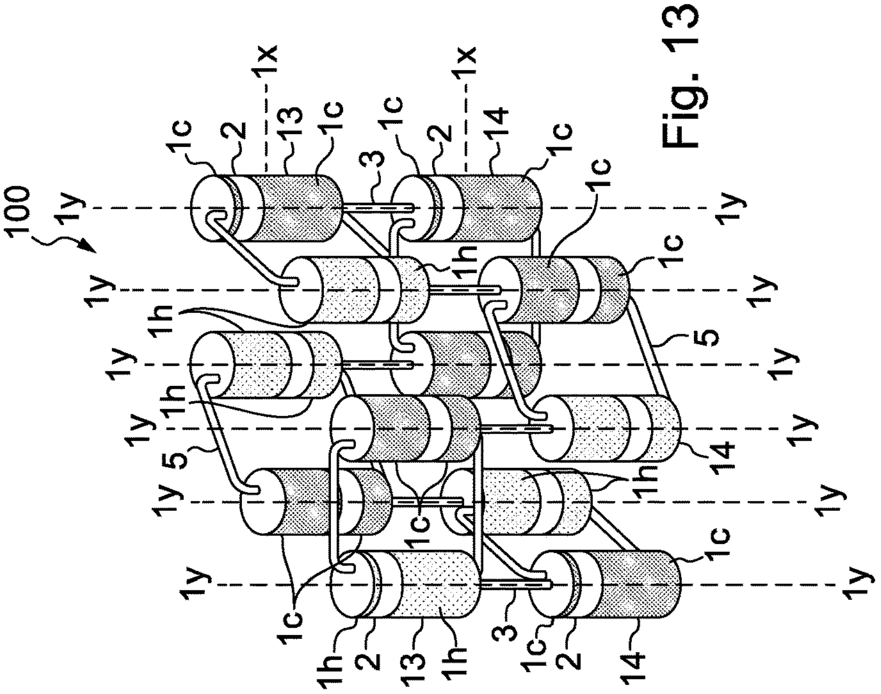
FIG. 13 shows a three dimensional view of a twelve cylinder embodiment of the device, including the distribution of expansion and compression cylinders.

As shown in FIG. 13, each cylinder comprises a lateral axis 1*x* and a longitudinal axis 1*y*.

The longitudinal axes 1*y* of the first and second cylinders 13, 14, that are connected via a piston 2 are in alignment and are coaxial, such as cylinders 13*a* and 14*b* shown in FIG. 17.

Each piston 2 of the engine 100 is configured to move, in use, along the longitudinal axis 1*y* of the cylinder in which the piston 2 is located.

The pistons 2 of the fluidly connected cylinders are parallel.

Each of the fluidly connected first cylinders 13 are adjacent to each other. The first and second cylinders 13, 14, of each piston assembly 16 are adjacent to each other. The fluidly connected second cylinders 14 are adjacent to each other.

Each first cylinder 13 is spaced apart from the second cylinder 14 to which it is connected.

In the embodiments illustrated here each cylinder is parallel to the cylinder to which it is fluidly connected. The longitudinal axis 1*y* of each cylinder is parallel to the longitudinal axis 1*y* of the cylinder to which it is fluidly connected, as shown in FIG. 13. The longitudinal axis 1*y* of each cylinder is axially offset from the longitudinal axis 1*y* of the cylinder to which it is fluidly connected.

The axial offset is along the lateral axis 1*x* of the cylinder.

The Stirling engine 100 may be included within a system, such as an engine apparatus, a vehicle, a generator or the like.

Figure 6:
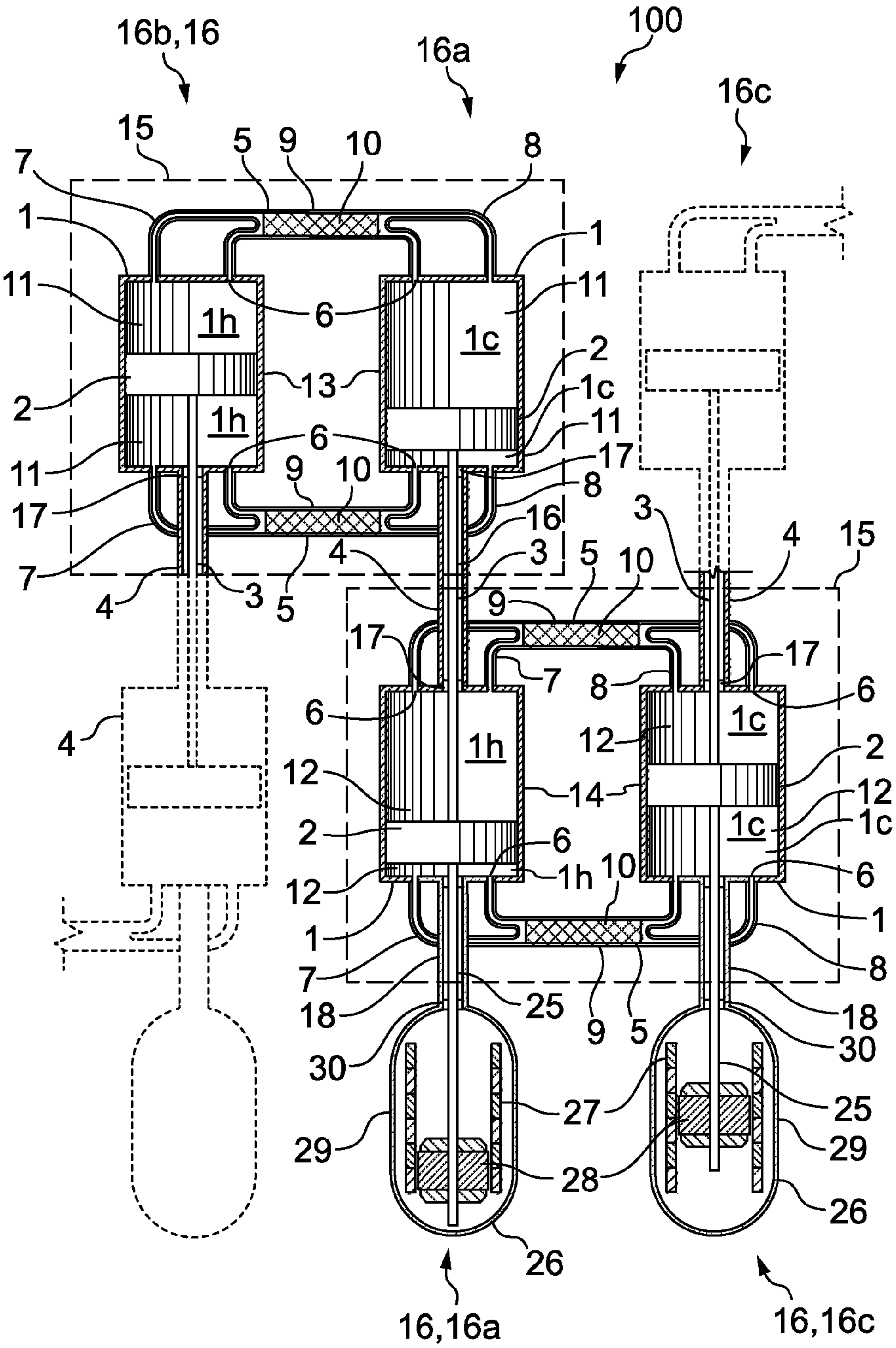
FIG. 6 shows a sectional elevation of four coaxially interconnected cylinders of the provided multi-cylinder compounding double acting Stirling engine arrangement.

There is provided a double acting alpha Stirling heat engine arrangement as shown in FIG. 6 whereby the reciprocating and double acting pistons 2 of a plurality of similar pairs of oscillating thermodynamic systems are interlinked by means of coaxially rigidly connected piston assemblies 16 such that the interconnected and compounded thermodynamic systems may oscillate resonantly and symmetrically in a series loop. Whereby the particular order, layout and configuration of each thermodynamic system 15 when connected by said rigid piston assemblies 16 and conduits 5 may permit the combined and resonant oscillations of each of the said systems within the arrangement.

Such that each first cylinder 13 of each thermodynamic system 15 of the embodiment of FIG. 6 may bound a pair of expansible spaces 11 separated by a double acting oscillating piston 2, and each expansible space 11 may be connected by at least one conduit 5 to an adjacent space of a second pair of expansible spaces 11 bounded by another first cylinder 13 and separated by a double acting oscillating piston 2. Such that the connected expansible spaces 11 may form a thermodynamic system 15 which contains a working fluid, which in this embodiment is a compressible gas. Each second cylinder 14 bounds a pair of expansible spaces 12 separated by a double acting oscillating piston 2, and each expansible space 12 is connected by at least one conduit 5 to an adjacent space of a second pair of expansible spaces 12 bounded by another second cylinder 14. The device is capable of free piston operation and the cumulative generated power of the engine 100 is converted by at least one power take off assembly 29 to generate usable energy.

Referring again to FIG. 6, and whereby one first cylinder 13 bounding each said pair of thermodynamic systems 15 may act as a heater, so that thermal energy may be capable to pass through the cylinder walls 1 and may heat the gas enclosed within each of the two expansible spaces 11 of the first cylinder 13, causing the enclosed working gas to expand. The other first cylinder 13 may act as a cooler, such that thermal energy may be capable to be rejected through the cylinder walls 1 from the working gas within each of the two expansible spaces 11 of the cylinder 13, such that the working gas may be capable to cool and contract or compress.

Thus one of the first cylinders 13 may be described as an expansion cylinder 1*h* and another of the first cylinders 13 may be described as a compression cylinder 1*c* and whereby each pair of expansion 1*h* and compression 1*c* first cylinders 13 may bound two separate thermodynamic systems 15 composed of a working fluid and connected by at least one conduit 5, and separated by said reciprocating double acting pistons 2 such that the working fluid may be capable to oscillate synchronously within each thermodynamic system 15 relative to the adjacent system, and whereby the heated expansion spaces 11 and the cooled compression spaces 11 of each thermodynamic system 15 are distributed and isolated, one from the other. It will be appreciated from FIG. 6 that the thermodynamic system 15 formed by the two second cylinders 14 shown operates in the same way. The spatial distribution of each pair of thermodynamic systems is indicated by the rectangular dotted line 15, of FIGS. 6, 8, 11 and 13. The method and order of distribution and interconnection of said thermodynamic systems within each provided embodiment is advantageous to the resonant and efficient operation of the arrangement and device.

And whereby as shown in FIG. 6 each double acting reciprocating piston 2 of each first cylinder 13 of each pair of thermodynamic systems 15 may be coaxially connected by a rigid rod 3 to at least one other double acting reciprocating piston 2 of another identical pair of second cylinders 14 bounding a similar pair of thermodynamic systems 15 and such that said connected pistons 2 may form a paired piston assembly 16. The piston connecting rod 3 may be bounded by a tube or sleeve 4 fixed between each cylinder casing such that the device may be capable to be hermetically sealed. Where the piston rods 3 penetrate the cylinder casings they may preferably be bounded by piston rod seals 17. As can be seen in FIG. 8, for each pair of cylinders 13, 14, which are axially connected as a reciprocating piston assembly 16, one of the cylinders is a compression cylinder 1*c* and one of the cylinders is an expansion cylinder 1*h*. As can be seen in FIG. 8, two of the first cylinders 13 are expansion cylinders 1*h* and two of the first cylinders 13 are compression cylinders 1*c*. Two of the second cylinders 14 are expansion cylinders 1*h* and two of the second cylinders 14 are compression cylinders 1*c*. In the embodiment of FIG. 8, each first cylinder 13 is connected via a piston 2 to the opposite type of expansion/compression second cylinder 14.

Figure 11:
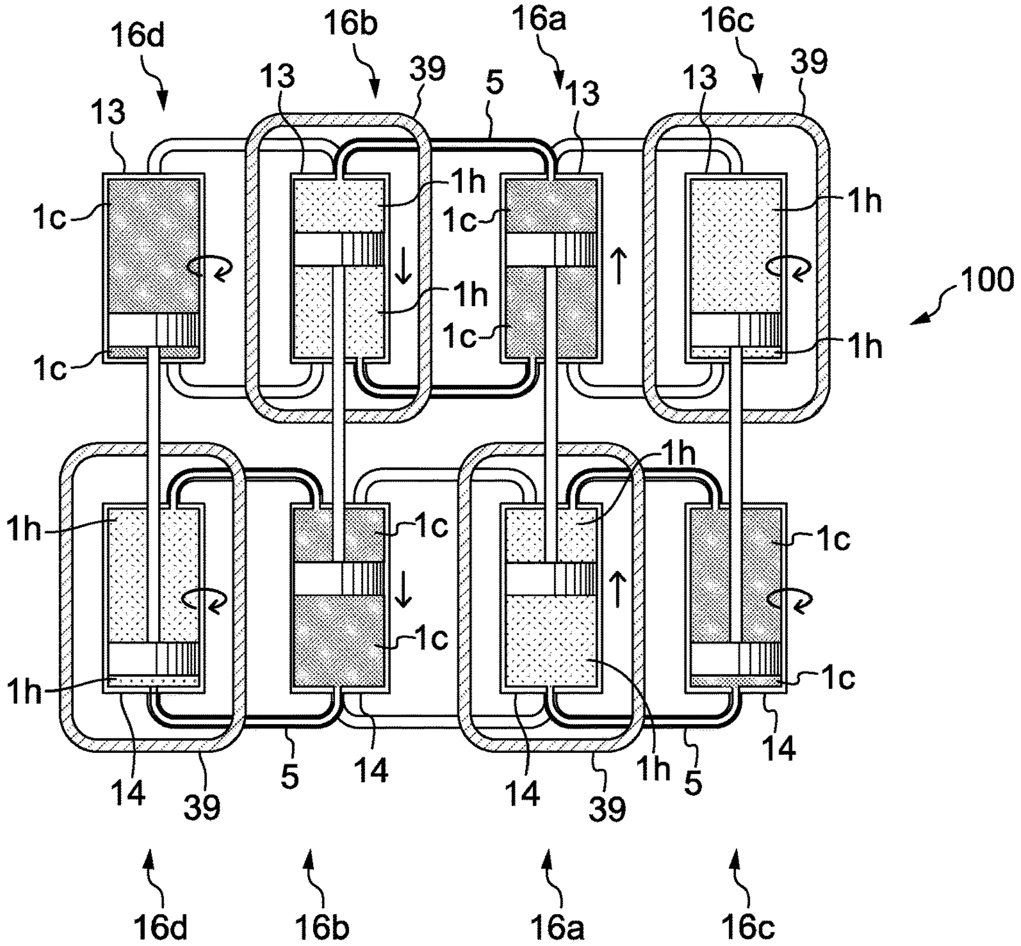
FIG. 11 shows a sectional elevation of the distribution of ducts supplying a fluid heat source to an embodiment of the device.

And whereby each expansible expansion space 11 of a first cylinder 13 is fluidly connected to an adjacent expansible compression space 11 of another first cylinder 13 such that as can be seen in FIG. 6 and in FIG. 8 and FIG. 11, each fluidly connected expansion 1*h* and compression space 1*c* is disposed on the same plane. As a consequence, and as shown in FIG. 6, each conduit 5 connecting each cylinder 13, 14 may be capable to be disposed generally axially perpendicular to the pistons 2 and piston assemblies 16 and cylinders 13, 14, and may each be generally disposed on the same plane. In the embodiment shown in FIG. 6, the conduits 5 include a pair of heat exchanger assemblies 7, 8, which are disposed on each side of a regenerator 9.

Because the interconnected thermodynamic systems 15 are so disposed such that all of the expansion and compression spaces 1*h*, 1*c*, of the fluidly connected systems are axially adjacent, the provided heat exchanger assemblies 7, 8 of the fluidly connecting conduit apparatus 5 are direct, straight and short, and fluid pumping or pressure losses may consequently be small, which is an advantageous condition for the efficient operation of a low temperature device. Additionally, because the physical and volumetric characteristics of all conduits 5 are identical, the thermodynamic cycles of each thermodynamic system 15 are also identical, such that they may oscillate harmonically and symmetrically relative to all other thermodynamic systems 15 within the device, and the provided compounded arrangement is capable of generating frequent and regular pressure peaks, such that the arrangement may be capable to operate as a free piston device. Therefore, crank shafts may be negated, and accordingly side forces on the piston rods 3 may be negated, frictional wear from crank shaft bearings and piston rod seals 17 may be negated, and the device may be capable to be hermetically sealed and highly pressurised, and may be capable to self-start. It will be appreciated that in other embodiments, the thermodynamic systems 15 need not be identical.

Figure 7:
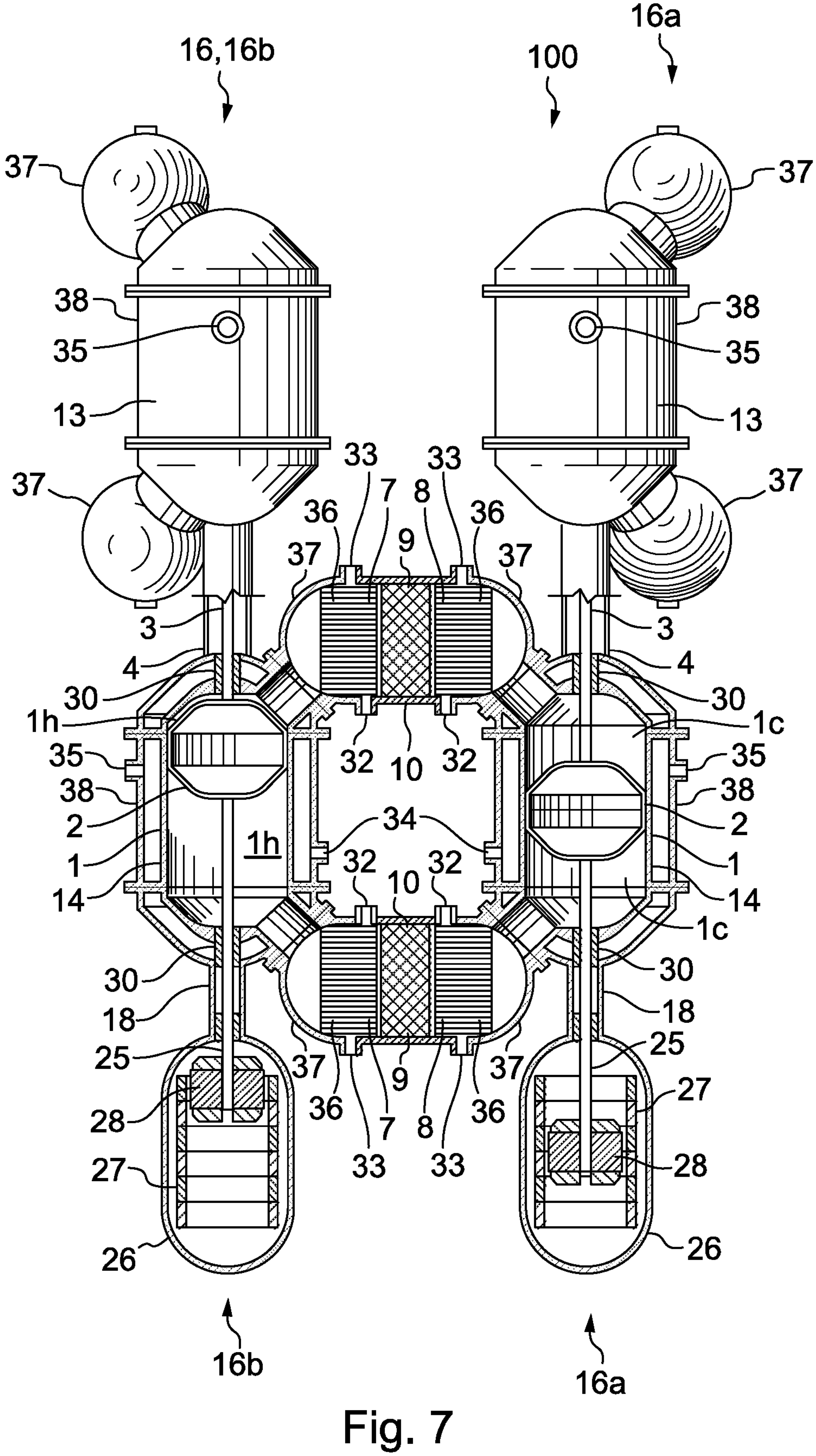
FIG. 7 shows a detailed section through two fluidly connected cylinders of the provided multi-cylinder device.

In the embodiment shown in FIGS. 6 and 7, each heat exchanger assembly 7, 8 is composed of a plurality of tubes 36 through which the working fluid can pass and which presents a high surface area of heat exchange relative to the enclosed gas volume. Any suitable heat exchanger assembly can be used.

FIG. 7 shows a detailed representation of the arrangement of FIG. 6, which includes additional elements.

Figure 9:
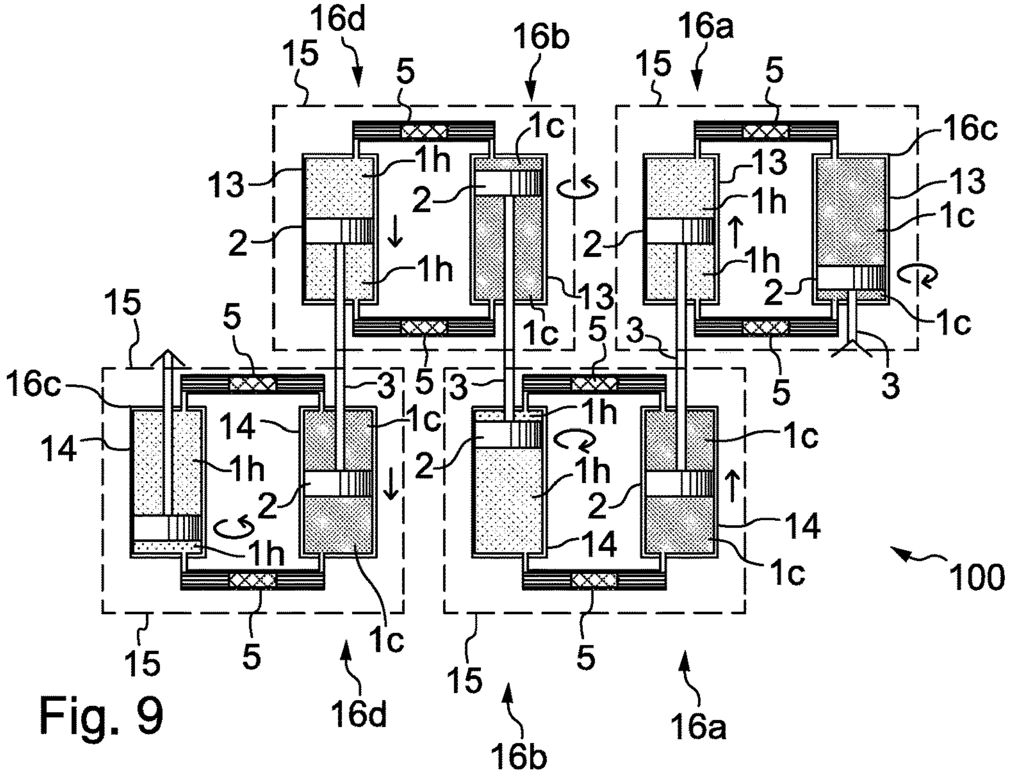
FIG. 9 shows a sectional elevation of an eight cylinder embodiment of the device, including the distribution of expansion and compression cylinders, the distribution piston phase angles and the direction of piston movement.

FIG. 8 shows a simplified three dimensional representation of the layout of the cylinders 13, 14 and conduits 5 of FIG. 6 and FIG. 7. FIG. 9 shows the general layout of the expansion and compression cylinders of FIG. 6 and FIG. 7 and also shows the time variable disposition of the phase angles of the pistons of each thermodynamic system and the time variable direction of movement of each piston such that each system may oscillate resonantly and cumulatively. As shown in FIG. 7, each hot side heat exchanger 7 tube assembly 36 may preferably be enclosed within a shell or casing 37 with at least one inlet 32 and outlet 33, such that a fluid heat source (an example of a heating medium), which can be a gas or a liquid, or other fluid, may enter the at least one inlet 32, can be fluidly distributed about the heat exchanger tubes 36 and can exit via the at least one outlet 33. Similarly, the cold side heat exchanger 8 tubes 36 can be surrounded by a coolant (an example of a cooling medium) which could be water or air or another fluid, and which could enter the shell casing via at least one inlet 32 and may exit via at least one outlet 33.

The shell 37 and tube 36 heat exchanger assemblies 7, 8 as shown in FIG. 7 are a proven, simple and efficient design which are used in a variety of industrial applications, and which may be economically sourced and deployed within the embodiments illustrated and described here. As can be seen in FIG. 7 the provided conduit assembly 5 and apparatus may easily be demounted from the port 6 connections and may be dismantled and cleaned if fouling or scaling occurs. This is an important benefit and advantage of the provided assembly and arrangement, particularly when using geothermal brine or other contaminated fluids as a heat source. Other heat exchanger configurations may alternatively be deployed which are well known by those skilled in heat exchanger design, which may include flat plate heat exchanger assemblies or other suitable assemblies. In the embodiment shown in FIG. 7, the regenerator 9 which separates the two heat exchangers 7, 8 is composed of a duct or tube of circular section, which contains a porous material 10, with a high surface area, which in this embodiment is a metallic mesh or random metallic fibres or another metallic or other matrix, and which is capable to rapidly absorb and release thermal energy.

Figure 10:
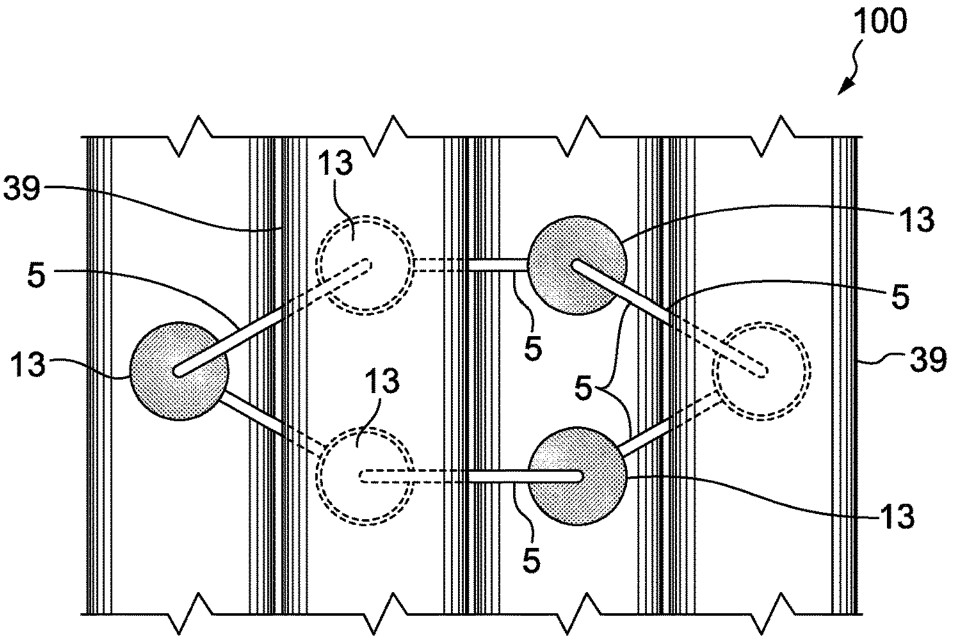
FIG. 10 shows a plan view of the distribution of ducts supplying a fluid heat source to an embodiment of the device.

In other embodiments as shown in plan in FIG. 10 and in elevation in FIG. 11 the shell casings 37 which contain and direct the working fluid around the hot heat exchanger 7 tubes 36 and cylinders 13, 14 have been replaced by a continuous duct 39 disposed generally perpendicular to the cylinder coaxes and which permits a channeled flow of the liquid or gaseous heat source about both the heat exchanger apparatus and the cylinders. Depending on the nature of the fluid heat source and the configuration of said ducts, the requirement for pumping of said fluid about the heat exchangers 7 and cylinders 13, 14 may be negated.

In the embodiment of FIG. 7 the expansion and compression cylinders are enclosed within shells or casings 38 such that a fluid heat source may enter the hot cylinder shell 38 via at least one inlet 34, may surround the cylinder 14 and may exit via at least one outlet 35. Similarly, a fluid coolant may enter the cold cylinder 14 shell 38 via at least one inlet 34, may be fluidly disposed on the cylinder casing and may exit via at least one outlet 35.

In the embodiment shown in FIGS. 6 & 7 the piston assemblies 16 are connected by a rigid rod 25 to a power take off means, which in this embodiment is a linear alternator assembly 29 contained within a hermetically sealed casing 26. The piston rod 25 is bounded by a tubular sleeve 18. Said linear alternator 29 is composed of metallic coils and stators 28 and permanent magnets 27. As can be seen in FIG. 6, the stator 28 is attached to the piston rod 25 and acts as the oscillating component, or alternatively, as can be seen in FIG. 16 the permanent magnets 27 can be attached to the piston rod 25 and may act as the oscillating component. The power take off may alternatively be a generator, pump, compressor or another such power take off arrangement. In the embodiment shown in FIG. 6, the piston rod 25 is guided and stabilised by at least one piston rod guide or bearing 30.

A plurality of embodiments of the arrangement may be provided, whereby as a consequence of the specific configuration and interconnection by said rigid compounding and reciprocating piston assemblies 16 of said paired thermodynamic systems 15 composed of an expansion cylinder and compression cylinder and fluidly connected by short and equal conduits disposed on a plane generally perpendicular to said piston assemblies 16, each thermodynamic system 15 may oscillate harmonically relative to all other said thermodynamic systems 15 in a series connected loop and such that the pressure waves of each thermodynamic system 15 acting upon each double acting piston 2 may be cumulative and harmonic and so may provide useful power.

As shown in the embodiments of FIGS. 6 and 7, at least four pairs of interconnected thermodynamic systems 15 are capable of being interlinked in a series connected loop by piston assemblies 16, and by short and identical conduit connections 5 which are axially aligned on the same plane, such that the pistons 2 of the arrangement may be capable to resonantly reciprocate as a consequence of the oscillating pressure waves of each thermodynamic system 15.

As shown in the three dimensional depiction of FIG. 8 and in elevation in FIG. 9 the provided eight cylinder Stirling engine 100 as also depicted in FIGS. 6 and 7 is disposed whereby each piston assembly 16 connects an expansion cylinder 1*h* to a compression cylinder 1*e* via a piston 2, each first cylinder 13 is fluidly connected to another first cylinder 13, and each second cylinder 14 is fluidly connected to a second cylinder 14. So that there is provided eight fluidly connected and mutually resonant thermodynamic systems and pressure waves enclosed with four pairs of cylinders 13, 14 connected and bounded by four pairs of reciprocating rigid piston assemblies 16 whereby all conduit connections are on the same plane, are perpendicular to the piston 2 and cylinder 13, 14, coaxes and are short and direct and such that each thermodynamic system 15 may be interconnected in a series loop.

The capability for consonant, harmonic and cumulative oscillation of each thermodynamic system can be seen in FIG. 9. This figure shows the time variable directional movement of each piston 2. As can be seen, the time variable disposition of the individual phases of the thermodynamic cycle of the provided eight cylinder compounded arrangement are the same as those depicted in the prior art of the four cylinder Siemens Rina configuration of FIG. 3, and the thermodynamic phase angles are therefore also similar. However, because the thermodynamic systems 15 of the provided arrangement of FIG. 6, are connected and compounded by pairs of piston assemblies 16, the phase angle is calculated as a factor of the number of pairs of cylinders, rather than by the total number of cylinders within the arrangement. Such that it can be seen that the thermodynamic systems 15 of both devices may operate with the same phase angle, which equates to 360 degrees divided by four, or 90 degrees. The specific power density of the provided arrangement of eight cylinders of FIGS. 8 and 9 will be approximately double that of the four cylinder Siemens Rinia array of FIG. 3.

It is known by those skilled in the art that low temperature devices with higher thermodynamic phase angles may provide higher system efficiencies. Therefore, the provided method and arrangement may permit the addition of pairs of piston and cylinder assemblies whereby the phase angle of the provided arrangement may be increased and the balance of the power output relative to efficiency may be optimised. Each new phase angle is provided by the addition of a pair of cylinders whereby, for example, by the incremental addition of two pairs of pistons 2 and cylinders 13, 14, on the same plane and in a series loop as shown in FIG. 12 and as shown in the three dimensional depiction of FIG. 13, this embodiment has six pairs of cylinders 13, 14. Such that there is provided a phase angle of 120 degrees and therefore with a higher system efficiency at lower temperatures.

And such that as can be seen from the directional arrows of FIG. 12, each time and spatially variable piston phase of each thermodynamic system 15 of the twelve cylinder embodiment corresponds to the phase angles of each of the thermodynamic systems of the six cylinder Siemens Rinia arrangement as shown in FIG. 4 and whereby both arrangements may operate with the same phase angle of 120 degrees. The power density of the provided twelve cylinder arrangement is approximately twice that of the Siemens Rinia six cylinder arrangement and, because the provided twelve cylinder embodiment is compounded and balanced and the pressure peaks are regular and symmetric, free piston operation is achievable. Preferably a linear alternator may be connected to each of the six piston assemblies 16, and may be capable to capture power generated by the oscillating pressures of the twelve thermodynamic systems of the twelve cylinder embodiment of FIGS. 12 and 13.

Figure 14:
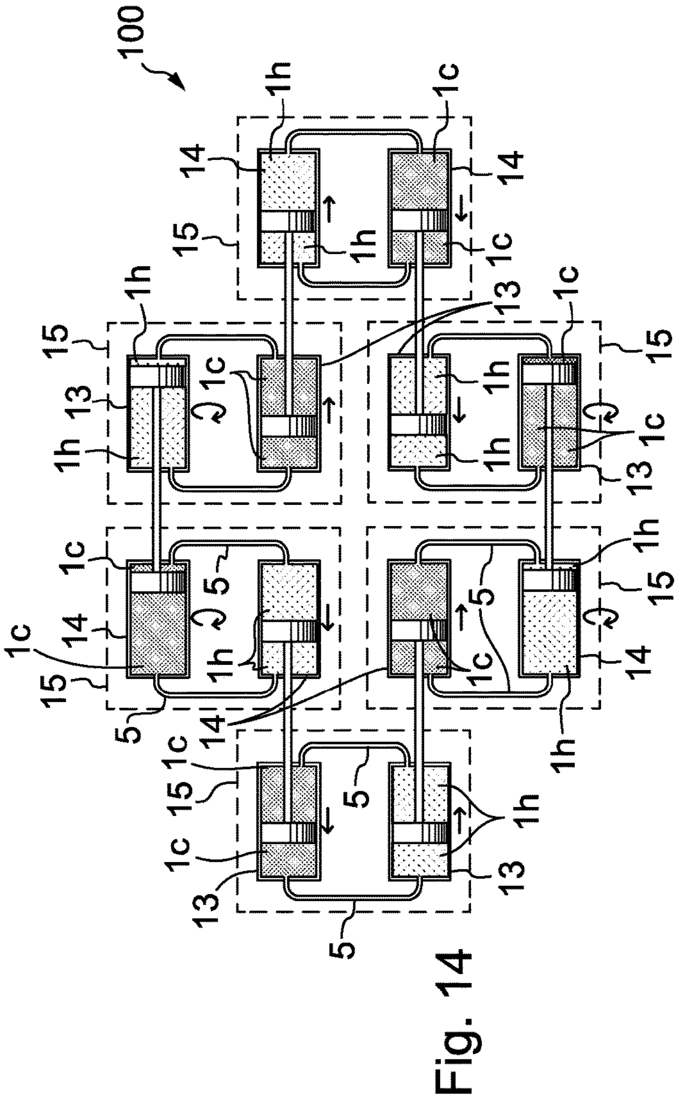
FIG. 14 shows a twelve cylinder embodiment showing the direction of movement and the phase angles of the pistons of each thermodynamic system, which is coaxially connected such that all the cylinders are distributed on the same axis.

In other embodiments of the arrangement as shown in FIGS. 14 and 15 the pairs of thermodynamic systems 15 are arranged on the plane of the coaxes of each piston assembly 16 in an interconnected series loop. The time variable directional arrows of the oscillating piston assemblies 16 show that the phase angles and thermodynamic cycles of the provided twelve cylinder embodiments of FIG. 14 and FIG. 15 correspond to those of the six cylinder Siemens Rinia device of FIG. 5. Such that the combined pressure waves of the provided interconnected and compounded thermodynamic systems 15 resonate harmonically, and with a high power density, high thermal and mechanical efficiencies and the capability for free piston operation. The provided embodiment whereby cylinders are arranged on the same plane may therefore permit the entire length of each expansion cylinder to be exposed to directional thermal energy, which may, for instance, be solar radiation.

As can be seen in FIG. 15, in some embodiments pistons 2 may be capable to operate with a very long piston stroke relative to piston bore diameter such that the high ratio of the surface area of the cylinder walls 1 of each cylinder 13, 14, relative to the cylinder volume may be capable to provide the major fraction of heat exchange. Such embodiments may preferably negate the requirement for expensive heat exchanger assemblies 7, 8 to be deployed within the fluidly connecting conduits 5. In the embodiment of FIG. 15 the advantage of the capability for short and straight fluidly connecting conduits 5 between the cylinder heads of adjacent expansible spaces is clear. The requirement for long, expensive and inefficient conduits fluidly connecting from the head of one cylinder to the base of a following cylinder is negated as a consequence of the specific order and disposition of pairs of thermodynamic systems 15 and their interconnection by conduits 5 and piston assemblies 16 so that the pressure waves of each system may resonantly oscillate in a series loop.

FIG. 15 shows double acting piston and rod assemblies reciprocating within the embodiment whereby the continuous axial connection of four pistons 2 by interconnecting rods is achieved due to the disposition of the expansion and compression cylinders 13, 14, such that, as can be seen from the directional arrows, all the time and spatially variable phase angles are identical and the directional movement of each piston 2 within each expansion and compression cylinder 13, 14, is synchronous, such that all of the thermodynamic systems may be capable to resonantly oscillate.

As shown in FIG. 16, in certain free piston embodiments, the attachment of a damping assembly 23 to the connecting rod 3 of each piston assembly 16 may prevent the collision of the pistons 2 with cylinder heads as a consequence of overextension, and may provide a centering force on each piston 2 in order that a mean piston centre position may be maintained during operation. The damping assembly 23 is configured to apply a damping force to two of the pistons of the engine. As shown in FIG. 16 the damping assembly 23 may be composed of planar springs (an example of a biasing element) or another suitable damping method and may be bounded by a hermetically sealed damping assembly casing 24.

In addition to the action of the planar springs, the gas forces of each thermodynamic system may act as a gas spring upon the reciprocating mass of each piston and the connected oscillating component of the alternator 29 in order to provide a resonant system. In further embodiments the device may be capable to operate in reverse, whereby as a consequence of the mechanical oscillation of at least one of the piston rods, the arrangement may be capable to operate as a cooler or a cryocooler.

In the embodiment as shown in FIG. 16 the connected piston assemblies 16 are composed of diaphragm pistons 19.

Diaphragm piston assemblies are known from prior art in relation to Stirling engine arrangements.

However, as far as is known, they have only been proposed in arrangements in which the diaphragm piston 19 separates an expansion space and a compression space. No prior art is known whereby a diaphragm piston 19 separates either a pair of compression spaces 1*c* or a pair of expansion spaces 1*h* within a cylinder 13, 14 and whereby pairs of thermodynamic systems 15 are contained within separate expansion and compression spaces 11, 12 connected by conduits 5 as is provided in the present embodiment of the Stirling engine 100 shown in FIG. 16. This embodiment of the provided arrangement offers the benefit of negating the issue of thermal losses through the relatively thin elastomeric membrane 20 and rigid disc 22 of the diaphragm assembly, and through the cylinder walls 1, because the temperatures of the working fluid on each side of the double acting diaphragm piston 19 remain similar throughout each time variable thermodynamic cycle.

Another important and valuable benefit of the provided diaphragm embodiment of FIG. 16 is the capability for the deployment of a large cylinder bore diameter. For a typical double acting alpha type Stirling engine, the ratio of bore and stroke is generally optimised at around 2:1. This is primarily because the length of the leakage path increases with the diameter, so that a larger diameter will tend to result in excessive leakage past the piston 2. The provided diaphragm piston 19 assembly offers the important benefit of a hermetic seal between each thermodynamic system 15 and therefore no leakage between the separate thermodynamic spaces 11, 12 can occur, and in addition friction losses arising from piston seals are negated such that bores with very large diameters relative to piston stroke are available. Therefore, the surface area of the cylinder casing relative to the volume of the expansion or compression space may be substantially increased, and so the heat exchange capability though the cylinder walls 1 may consequently substantially increase the overall efficiency of the arrangement The diaphragm piston 19 embodiment of FIG. 16 is fabricated from at least one flexible or elastomeric material 20 (an example of a biasing member for applying a biasing force to the piston 19) and is formed about, and attached, by at least one clamping ring, to a rigid and circular disc 22, such that said flexible or elastomeric material 20 forms an annulus about said disc 22. The at least one flexible or elastomeric material 20 of the annulus of each said diaphragm piston 19 can be clamped to the perimeter of said chamber by at least one clamping ring 21 or another fixing arrangement which could include a plurality of fixings in order that a continuous seal can be provided.

Each piston disc 22 and connected components can be of a specific and adjustable mass such that the diaphragm pistons 19 are capable to be tuned to oscillate to the natural frequency of the mass-spring system. The flexible or elastomeric membrane 20 is also capable to provide a spring force which can be adjusted to the natural resonance of the oscillating thermodynamic systems and piston assemblies.

Each expansion and compression space 11, 12 can be configured to optimize the swept volume within each space such that the casing walls 1 may preferably be tapered towards the casing end or head, such that the casing may approximately conform to the swept geometry of each said oscillating diaphragm piston 19.

Modifications and improvements may be made to the above embodiments without departing from the scope of the invention. For example, one or more cylinders could be connectable to a source of heat energy or a cooling element, such as a heat sink. Each cylinder may be connectable to a source of heat energy or a cooling element. The engine 100 could be configured to apply heat to the expansion cylinders and/or to apply cooling to the compression cylinders, as is known in the field of Stirling engines.

The cooling element may be connected to a source of cooling fluid. The cooling fluid may be air, ambient air, or the like.

The heat source may be configured to heat the cylinder, or cylinders to which it is connected by a temperature of up to about 1,000 degrees Centigrade, optionally up to about 700 degrees Centigrade, up to about 300 degrees Centigrade, optionally up to about 220 degrees Centigrade, optionally up to about 200 degrees Centigrade, optionally between about 80 degrees Centigrade and about 1,000 degrees Centigrade, optionally between about 80 degrees Centigrade and about 300 degrees Centigrade, optionally between about 100 degrees Centigrade and about 200 degrees Centigrade, optionally at least 600 degrees Centigrade, optionally at least 700 degrees Centigrade.

The engine may be configured to apply a temperature difference between each fluidly connected expansion and compression cylinders of up to 1,000 degrees Centigrade, optionally up to about 800 degrees Centigrade, optionally up to about 750 degrees Centigrade, optionally up to about 500 degrees Centigrade, optionally up to about 300 degrees Centigrade, optionally up to about 200 degrees Centigrade, optionally between about 100 degrees Centigrade and about 200 degrees Centigrade.

EMBODIMENTS

1. A heat energy conversion device and a method for generating usable energy by means of a plurality of interconnected thermodynamic Stirling cycles and utilising a working fluid, whereby the improvement comprises;

double acting piston cylinders, each bounding a pair of expansible spaces separated by a reciprocating piston, whereby each pair of said expansible spaces within each cylinder are always either both expansion spaces or both compression spaces, and whereby each said double acting reciprocating piston is coaxially rigidly coupled by a rod or other rigid coupling to at least one further said double acting piston enclosed within another said cylinder, such that a reciprocating piston assembly may be formed which connects the said at least two cylinders, and whereby the reciprocating movement of each reciprocating piston assembly may provide simultaneous variations in the volumes of at least four of said expansible spaces, and whereby an arrangement of a minimum of eight pairs of expansible spaces within eight cylinders and further embodiments of additional increments of four pairs of said expansible spaces within four additional cylinders, may permit a plurality of piston configurations whereby each expansion space may always be capable to be located adjacent to and coaxially parallel with a compression space such that said adjacent spaces may be fluidly interconnected by at least one conduit to form oscillating thermodynamic Stirling cycles composed of an expansion and compression space, and such that said conduit connections may be capable to be short, equal, similar and direct, and whereby the coaxis of each said fluidly connecting conduit may be capable to be approximately perpendicular to the coaxes of each piston assembly, and whereby said thermodynamic cycles may be interconnected in a series loop such that all piston assemblies may be thermodynamically interlinked, and such that the time variable phase angles of said reciprocating double acting pistons of each said thermodynamic cycle may be similar, and such that the oscillating pressures of all the cycles acting on each piston assembly may add together, and such that the time variable pressure cycle of each piston assembly may be similar and may result in symmetric power generation, and whereby the reciprocating movement of at least one said piston assembly may be connected to at least one power take off assembly which may generate useful power.

2. A device and method for generating usable energy according to embodiment 1 whereby the piston assemblies may operate as free piston assemblies.

3. A device and method for generating usable energy according to embodiments 1 and 2 whereby at least one free piston assembly may be rigidly coupled by a coaxially connecting rod to a linear generator or alternator assembly which may be capable to generate electricity.

4. A device and method for generating usable energy according to embodiment 1 whereby the piston assemblies may be connected by rotable piston rods to a rotating crank assembly.

5. A device and method for generating usable energy according to embodiment 4 whereby the rotating crank assembly may be connected to an electrical generator.

6. A device and method for generating usable energy according to embodiment 1, 4 and 5 whereby each power take off assembly may be bounded by a casing and whereby the entire heat energy conversion device may be hermetically sealed.

7. A device and method for generating usable energy according to embodiment 1 whereby the working fluid of each thermodynamic cycle may pass through at least one regenerator assembly, which may form a part of the at least one fluidly connecting conduit assembly which connects each said expansion space and compression space.

8. A device and method for generating usable energy according to embodiments 1 and 7 whereby the regenerator assembly may enclose heat absorbing and emitting materials with a high surface area.

9. A device and method for generating usable energy according to embodiments 1 and 7 whereby the working fluid may pass through heat exchanger assemblies which may be deployed on each side of the regenerator assemblies and which may form a part of each fluidly connecting conduit assembly of each thermodynamic cycle.

10. A device and method for generating usable energy according to embodiment 9 whereby each heat exchanger assembly may include a plurality of tubes or conduits with a high surface area and which may be bounded by a shell casing through which a coolant or heat source may flow.

11. A device and method for generating usable energy according to embodiment 1 whereby each piston of each piston assembly may be composed of a diaphragm piston.

12. A device and method for generating usable energy according to embodiment 11 whereby each diaphragm piston of each piston assembly may be composed of a rigid disc and whereby the inner perimeter of an elastomeric annulus may be attached to the outer perimeter of said rigid disc, and whereby outer perimeter of said elastomeric annulus may be clamped to the piston casing, whereby a hermetic seal and separation may be formed between the expansible spaces in each cylinder.

13. A device and method for generating usable energy according to embodiment 1 whereby there may be deployed at least one damping device which may be attached to the shaft of each piston assembly such that the collision of each piston with each respective piston cylinder head may be prevented.

14. A device and method for generating usable energy according to embodiment 13 whereby the damping device may be composed of at least one mechanical spring.

15. A device and method for generating usable energy according to embodiment 13 whereby the damping device may be composed of a gas spring or an elastomeric spring or another type of mechanical damping device.

16. A device and method for generating usable energy according to embodiment 1 whereby there may be deployed at least one electronic piston assembly damping device which may be capable to vary the load of each electromagnetic power take off during each reciprocation of each time variable piston assembly.

17. A device and method for generating usable energy according to embodiments 1, 3 and 16 whereby all electronically interconnected PTOs may be capable of interconnected maximum power point operation.

18. A device and method for generating usable energy according to embodiment 1 whereby each expansion cylinder may be bounded by a casing with at least one inlet port and at least one outlet port such that a fluid heat source may be capable flow between said cylinder and said casing.

The invention claimed is:

1. A Stirling engine comprising:

at least four piston assemblies, wherein each piston assembly comprises:

a first cylinder comprising a piston configured to separate at least two expansion or compression chambers of the first cylinder;

a second cylinder comprising a piston configured to separate at least two expansion or compression chambers of the second cylinder;

wherein the pistons of the first and second cylinders are connected, such that the first and second cylinders form each piston assembly;

wherein a first chamber of the first cylinder of a first piston assembly is fluidly connected to a first chamber of a first cylinder of a second piston assembly, and wherein a second chamber of said first cylinder is fluidly connected to a second chamber of the first cylinder of the second piston assembly; and wherein a first chamber of the second cylinder of the first piston assembly is fluidly connected to a first chamber of a second cylinder of a third piston assembly, and wherein a second chamber of the second cylinder of the first piston assembly is fluidly connected to a second chamber of the second cylinder of the third piston assembly; and wherein a first chamber of the second cylinder of the second piston assembly is fluidly connected to a first chamber of a second cylinder of a fourth piston assembly, and wherein a second chamber of the second cylinder of the second piston assembly is fluidly connected to a second chamber of the second cylinder of the fourth piston assembly;

such that a working fluid to be compressed/expanded can flow between the fluidly connected chambers of the respective piston assemblies; and wherein each piston assembly is a free piston assembly, wherein at least one free piston assembly is rigidly couplable by a coaxially connecting rod to a linear generator or alternator assembly to generate electricity.

2. The engine of claim 1, wherein the engine is configured in a closed loop arrangement.

3. The engine of claim 1, wherein each first cylinder and each second cylinder of each piston assembly is configured as an expansion cylinder or a compression cylinder.

4. The engine of claim 3, wherein the engine is configured such that the chambers of each expansion cylinder are fluidly connected to the chambers of a compression cylinder.

5. The engine of claim 3, wherein the first and second cylinders of each piston assembly are configured to be the opposite type of expansion/compression cylinder to each other.

6. The engine of claim 3, wherein the first cylinder of each piston assembly is configured to be the opposite type of expansion/compression cylinder to the cylinder to which it is fluidly connected.

7. The engine of claim 3, wherein the second cylinder of each piston assembly is configured to be the opposite type of expansion/compression cylinder to the cylinder to which it is fluidly connected.

8. The engine of claim 1, wherein each first cylinder of each piston assembly is fluidly connected to a first cylinder of another piston assembly, and each second cylinder is fluidly connected to a second cylinder of another piston assembly, such that the first and second cylinders of each piston assembly are fluidly connected to different piston assemblies.

9. The engine of claim 1, wherein each of the fluidly connected chambers have a fluid flow path therebetween for the working fluid, and wherein at least one of: (i) the fluid flow paths between the chambers of the fluidly connected first cylinders, (ii) the fluid flow paths between the chambers of the fluidly connected second cylinders, and (iii) the fluid flow paths between each of the fluidly connected chambers are substantially identical.

10. The engine of claim 9, wherein the fluid flow path between the first chambers of the first and second piston assemblies is configured to be substantially equal in length to the fluid flow path between the second chambers of the first and second piston assemblies, and wherein the fluid flow path between the first chambers of the first and third piston assemblies is configured to be substantially equal in length to the fluid flow path between the second chambers of the first and third piston assemblies.

11. The engine of claim 1, wherein at least one of: (i) each of the fluidly connected first cylinders are adjacent to each other, and (ii) each of the fluidly connected second cylinders are adjacent to each other.

12. The engine of claim 1, wherein the engine comprises one or more additional piston assemblies, the, or each, additional piston assembly being arranged such that the first cylinders thereof are fluidly connected to a first cylinder of a piston assembly of the engine and such that the second cylinders thereof are fluidly connected to a second cylinder of another piston assembly of the engine, and wherein the, or each, additional piston assembly has a piston connection between the first and second cylinders thereof.

13. The engine of claim 1, wherein the pistons of the first and second cylinders of each piston assembly are connected and wherein the first and second cylinders of each piston assembly are fluidly isolated from each other.

14. The engine of claim 1, wherein at least one, or each, piston comprises one or more biasing members for applying a biasing force to the piston, wherein the, or each, biasing member is connected between the piston and the cylinder, and configured to apply a biasing force to the piston as the piston moves within the cylinder.

15. The engine of claim 1, wherein the engine comprises one or more damping assemblies, wherein the, or each, damping assembly is configured to apply a damping force to one or more of the pistons of the engine.

16. A system comprising the Stirling engine of claim 1.

17. The engine of claim 1, wherein the pistons of each piston assembly are diaphragm pistons.

18. A method of operating an engine, the method comprising the steps of:

(i) providing a Stirling engine, the engine comprising:

at least four piston assemblies, wherein each piston assembly comprises:

a first cylinder comprising a piston configured to separate at least two expansion or compression chambers of the first cylinder;

a second cylinder comprising a piston configured to separate at least two expansion or compression chambers of the second cylinder;

wherein the pistons of the first and second cylinders are connected, such that the first and second cylinders form each piston assembly;

wherein a first chamber of the first cylinder of a first piston assembly is fluidly connected to a first chamber of a first cylinder of a second piston assembly; and wherein a second chamber of said first cylinder is fluidly connected to a second chamber of a first cylinder of the second piston assembly; and wherein a first chamber of the second cylinder of the first piston assembly is fluidly connected to a first chamber of a second cylinder of a third piston assembly, and wherein a second chamber of the second cylinder of the first piston assembly is fluidly connected to a chamber of a second cylinder of the third piston assembly; and wherein a first chamber of the second cylinder of the second piston assembly is fluidly connected to a first chamber of a second cylinder of a fourth piston assembly, and wherein a second chamber of the second cylinder of the second piston assembly is fluidly connected to a second chamber of the second cylinder of the fourth piston assembly;

such that a working fluid to be compressed/expanded can flow between the fluidly connected chambers of the respective piston assemblies;

wherein each piston assembly is a free piston assembly, wherein at least one free piston assembly is rigidly couplable by a coaxially connecting rod to a linear generator or alternator assembly to generate electricity; and (ii) providing a temperature difference between the fluidly connected expansion and compression cylinders, such that the pistons of each cylinder oscillate.

* * * * *